United States Patent
Newcomb et al.

(10) Patent No.: US 11,867,257 B1
(45) Date of Patent: Jan. 9, 2024

(54) FASTENING SYSTEM

(71) Applicant: Blaine Howard Newcomb, Denver, CO (US)

(72) Inventors: Blaine Howard Newcomb, Denver, CO (US); Dallas Wayne Elkins, Tucson, AZ (US)

(*) Notice: Subject to any disclaimer, the term of this patent is extended or adjusted under 35 U.S.C. 154(b) by 921 days.

(21) Appl. No.: 16/571,058

(22) Filed: Sep. 13, 2019

Related U.S. Application Data

(63) Continuation of application No. 16/290,903, filed on Mar. 2, 2019, now abandoned.

(60) Provisional application No. 62/637,888, filed on Mar. 2, 2018.

(51) Int. Cl.
*F16G 15/04* (2006.01)

(52) U.S. Cl.
CPC .................................. *F16G 15/04* (2013.01)

(58) Field of Classification Search
CPC ...................................................... F16G 15/04
See application file for complete search history.

(56) References Cited

U.S. PATENT DOCUMENTS

| | | | | |
|---|---|---|---|---|
| 3,153,829 A * | 10/1964 | Luketa | ................... | F16G 15/04 24/DIG. 49 |
| 4,353,203 A * | 10/1982 | Lotoski | ................... | F16G 15/04 59/85 |
| 4,363,159 A * | 12/1982 | Lischick | ............ | A44B 11/2588 24/DIG. 38 |
| 5,457,858 A * | 10/1995 | Lin | ........................ | A44B 99/00 24/511 |
| 5,535,796 A * | 7/1996 | Line | ........................ | F16G 15/04 24/698.2 |
| 6,405,414 B1 * | 6/2002 | Byrnes | .................. | A61M 25/00 24/339 |
| 7,032,372 B1 * | 4/2006 | Horvath | .................. | F16G 15/04 59/93 |
| 2013/0104494 A1 * | 5/2013 | Evangelista | .......... | F16B 7/0473 403/291 |
| 2013/0257071 A1 * | 10/2013 | Kutsen | .................... | B66C 1/125 294/82.1 |

* cited by examiner

*Primary Examiner* — David M Upchurch
(74) *Attorney, Agent, or Firm* — Baker Donelson

(57) ABSTRACT

A fastening system is provided herein. The fastening system employs at least one linking member and a retaining member configured to be fastened to one another. The fastening system permits guided fastening and unfastening of the linking and retaining members. Embodiments also include a quick-release mechanism that permits rapid coupling and uncoupling of the linking member and retaining member. Certain embodiments employ multiple, interconnected linking members that can be configured to be packed flat into a single linear plane. Embodiments are equipped with an attachment mechanism that enables an article's existing fastener to benefit from the fastening system disclosed herein.

12 Claims, 20 Drawing Sheets

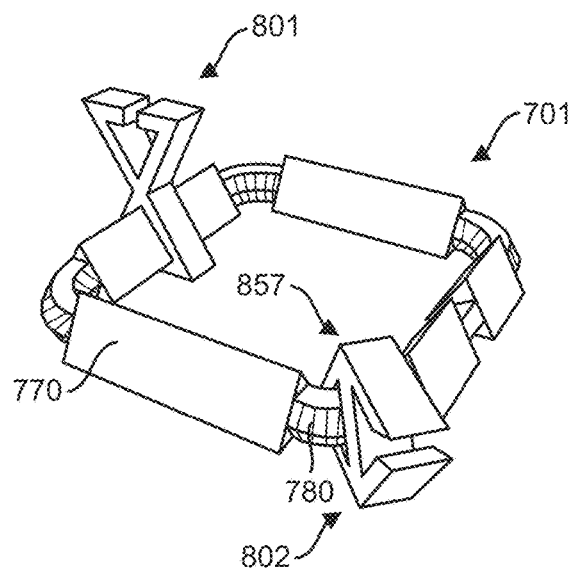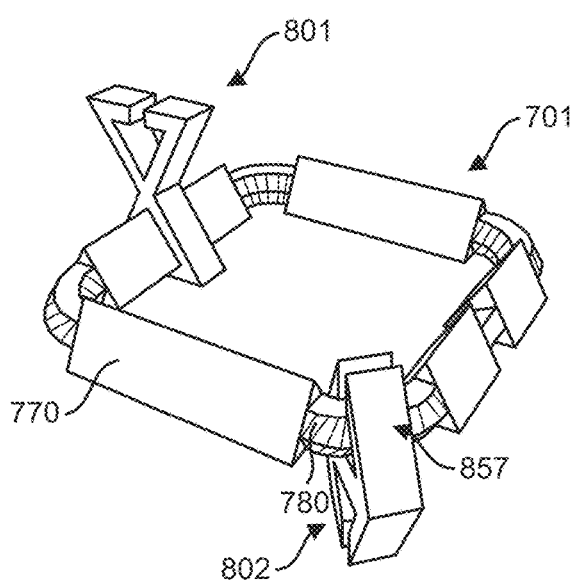
FIG. 10A　　　　　　　　FIG. 10B
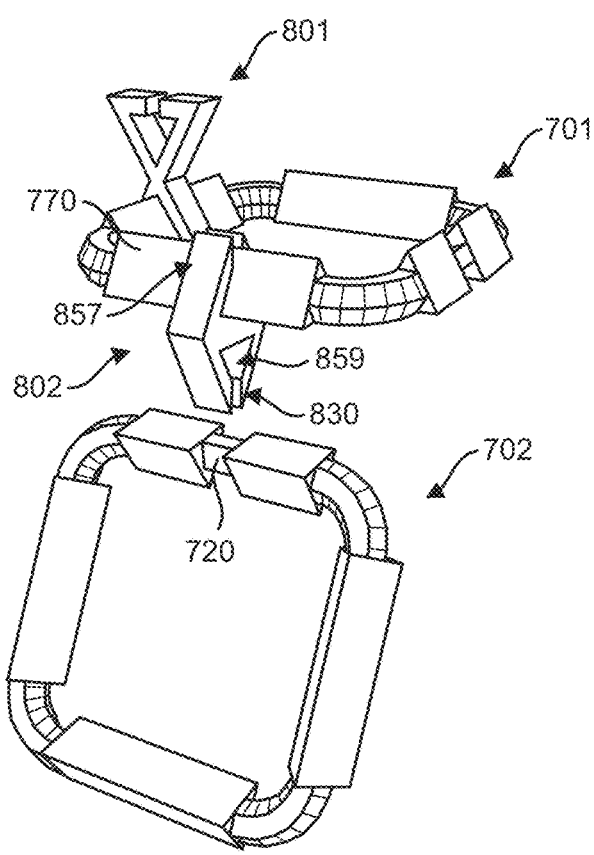
FIG. 10C

FASTENING SYSTEM

CROSS REFERENCE TO RELATED APPLICATIONS

This application is a continuation application of U.S. application Ser. No. 16/290,903, filed Mar. 2, 2019, which claims the benefit of U.S. Provisional Application No. 62/637,888, filed Mar. 2, 2018.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present inventive concept relates to the field of fastening systems. More particularly, the invention relates to improved fastening systems that are more versatile, easier to use, and more reliable.

TECHNOLOGY IN THE FIELD OF THE INVENTION

Traditional fastening systems such as clasps, hinges, buckles, and carabiners allow for the temporary joining of two objects or for temporarily attaching objects to clothing or other accessories. Non-permanent fastening is particularly important for many industries, professions, activities, and institutions. In many instances, repeated, rapid fastening and unfastening is often desired. This is particularly true for athletic activities, the fashion industry, jewelry, the military, firefighters, law enforcement, search and rescue teams, the medical field, and other industries. However, many traditional fasteners lack the ability to rapidly fasten or unfasten. The few fasteners designed to permit such rapid fastening/unfastening often wear out and fail after repeated use.

Many fasteners incorporate moving parts or springs that are particularly susceptible to wear and tear or other degradation over time that will adversely affect the structural integrity of the fastener. Several fasteners contain grooves, slots, holes, or other openings that may become clogged with foreign substances such as sand and dirt to prevent efficient operation of the fastener. Traditional fasteners are also often comprised of metal that is susceptible to rusting, bending, breaking, or other degradations with repeated use.

Furthermore, many fastening systems, such as those traditionally used for jewelry, require refined motor dexterity to operate efficiently. This is frequently problematic for young children who are still developing fine motor skills or for elderly individuals who may struggle to perform the required delicate movements. Dyskinesia or dystonia associated with movement disorders like Parkinson's disease and Huntington's disease can make the fine motor movements required to operate traditional fasteners very difficult or impossible. Other common physical afflictions such as inflammatory arthritis can prevent affected persons from opening and closing fasteners without experiencing significant pain. As a result of these and other factors, many individuals cannot operate traditional fasteners without assistance.

Numerous traditional fasteners are also prone to spontaneous unfastening, which can result in loss of the article being fastened or frustrate the user due to the hassle associated with constant refastening the article. Some fasteners are subjected to unintentional opening when the fastener is jostled or otherwise agitated in a manner that inadvertently releases a locking mechanism.

Fasteners are typically equipped with only a single mechanism for fastening and unfastening. Some are designed for a quick release, while others require much more labor-intensive fastening and unfastening. The quick-release fasteners are important for activities and professions where rapid access to the tethered article is required; however these quick-release fasteners often fail and quickly become unreliable. Although labor-intensive fasteners are usually more reliable than quick-release versions, it is often very difficult to remove an article secured via a labor-intensive fastener. Since the quick release and labor-intensive fastening systems are not interchangeable with one another, consumers must choose between the ease of use of a quick-release fastener or the security of a more labor-intensive fastener.

Fastening systems that are labor-intensive or otherwise difficult to remove can pose a significant danger under certain circumstance. By way of example, a buckling system equipped with a squeeze-release mechanism is a commonly used method of fastening helmets, backpacks, or other wearable protective gear and accessories. This squeeze-release buckling system often requires both hands to operate effectively and is impossible to release if neither of the wearer's hands are available for unfastening. Furthermore, these squeeze-release mechanisms provide no fail-safe options. The lack of a fail-safe release mechanism can be particularly dangerous for a wearer. For instance, during military operations, a soldier's helmet may become lodged within a tight space or catch a moving piece of machinery, thus requiring rapid removal when the soldier may not have adequate time to react or when her hands may be otherwise occupied. Similar situations may arise in multitude professions, industries, or activities where protective gear or accessories may become entangled in equipment or otherwise prevent the wearer from rapidly escaping a dangerous situation. In addition, shrapnel may enter a soldier's helmet and ricochet within the confines of the helmet, causing further injury that would be avoidable if the fastener were equipped with a fail-safe mechanism. Thus, the lack of a fail-safe or quick-release mechanism in traditional fastening systems can place the wearer at an elevated risk of serious injury or death.

Fasteners often secure articles that are delicate or easily damaged. Some articles, such as weapons, ammunition, or explosives can even pose a danger to the transporter and others if not handled with extreme care. However, most fasteners allow the fastened article to move freely within the fastener when tethered thereto. When attached to such a fastener, the article can be jostled and jarred, particularly when the transporter is moving quickly or the passes over rough terrain. Such agitation may damage the article or even trigger an unintended detonation of an explosive or discharge of a weapon. In addition, free movement of the article within the fastener also creates noise as the article bounces within the fastener. Furthermore, many fasteners create a clicking sound when the tethered article is removed. This is particularly problematic for military and law-enforcement operations, where complete silence is frequently required.

Thus, a noiseless fastening system is required that securely holds an article and permits rapid unfastening and fastening while also ensuring that the article will not be unintentionally released. The fastener should be readily adaptable for almost any need, yet provide both the security of labor-intensive fasteners and the accessibility of quick-release fasteners. An improved, durable fastening system should be devoid of moving parts and capable of withstanding repeated tethering and untethering without significantly affecting the structural integrity thereof.

An additional problem with current fasteners is that they are very restrictive in their use and are designed to hold only a limited number of articles. Thus, a more complex fastening system is required that allows for the attachment of multiple articles within the same, interconnected fastening system.

BRIEF SUMMARY OF THE INVENTION

A fastening system is disclosed herein. In one embodiment, the fastening system includes a linking member and a retaining member. In an embodiment, the linking member is formed from a body that is polygonal, circular, or elliptical in shape. In enclosed embodiments, the linking member is defined by an internal circumference and an external circumference, wherein the linking member further comprises a first faceted cross-sectional shape.

The linking member can further comprise a key section. The key section further comprises a second faceted cross-sectional shape. In certain embodiments, the second faceted cross-sectional shape comprises a form that is distinct from the first faceted cross-sectional shape.

The retaining member comprises a retaining portion, and the retaining portion further comprises a faceted interior circumference. In embodiments, the faceted interior circumference is complementary to the first faceted shape. When so constructed, the retaining portion is configured to be slidably coupled to the first linking member. The retaining member can further comprise a keyhole configured to selectively allow the key section of the first linking member to pass therethrough. The first faceted cross-sectional shape and retaining portion can be configured such that the linking member remains in a locked angular position relative to the retaining member when slidably coupled thereto.

In embodiments, the fastening system is equipped with a quick-release section. The quick release section can be configured to allow for rapid coupling and uncoupling of the linking member and retaining member under shear force.

The fastening system can additional include a docking section that prevents the retaining member from sliding along the circumference of the linking member. In embodiments, the docking station is further configured to securely maintain the linking member in the locked angular position relative to the retaining member. In one embodiment, the docking section comprises a raised texture, and the internal circumference of the retaining member comprises a recessed texture, or vice versa. In either instance, the raised textured comprises a form that is complementary to the recessed texture.

Embodiments of the fastening system also include a rotating section disposed along the body of the linking member. The rotating section allows the first linking member to rotate within the faceted interior circumference of the retaining portion when the retaining member is coupled to the rotating section. In embodiments, the key section serves as a rotating section.

In certain embodiments, a first linking member comprises a retaining portion. The linking system can also comprise a second linking member with a third faceted cross-sectional shape and a key section. In such embodiments, the retaining portion of the first linking member comprises a faceted interior circumference that is complementary to the third faceted cross-sectional shape. This complementary relationship allows the retaining portion to be slidably coupled to the second linking member. The retaining portion of the first linking member can also include a keyhole that selectively allows the key section of the second linking member to pass therethrough. The cross sectional shapes of the first and second linking members can be the same or may be different from one another.

Another aspect includes a multi-linker fastening system. In embodiments, the multi-linker fastening system includes a first linking member and a second linking member. Each of the linking members comprises an enclosed polygonal, circular, or elliptical shape with an internal circumference and an external circumference, and the internal circumference defines an interior space. The enclosed shape of the linking members is formed from a continuous cylindrical or polyhedral body. Embodiments with polyhedral bodies further comprise a faceted cross-sectional shape. The body of the first linking member can pass through the interior space of the second linking member, and the body of the second linking member can pass through the interior space of the first linking member. In this way, a chain-like connection is formed between the first and second linking members. When so connected, the body of the first linking member can move freely within the interior space of the second linking member and the body of the second linking member can move freely within the interior space of the first linking member.

In certain interconnected, multi-linker embodiments, the first and second linking members each include at least two notches. The at least two notches of the first linking member are configured to receive the at least two notches of the second linking member and vice versa. The notches of the first and second linking members are configured to allow the first and second linking members to lie in the same linear plane when the notches of the first and second linking members have received one another. When so oriented, the system assumes a packed-flat design. In certain embodiments, one of the at least two notches of each of the first and second linking members is upward-facing, and another of the at least two notches of the each of the first and second linking members is downward-facing. In such embodiments, the upward-facing notch of the first linking member is designed to receive the downward facing notch of the second linking member, and vice versa. Likewise, the upward-facing notch of the second linking member is designed to receive the downward-facing notch of the first linking member and vice versa. In certain embodiments, at least one of the notches of the first and second linking members is further configured to serve as a key section.

The linking member, retaining member, or both can comprise a means for attachment of the fastening system to an article, person, vehicle, tool, or device. In embodiments, the attachment section of the linking member, retaining member, or both is configured to be tied, hooked, clipped, or otherwise attached to an article, person, vehicle, tool, or device. In one embodiment, the attachment section comprises a generally circular, elliptical, or polygonal hole, gap, or notch. In alternative embodiments, the attachment section is configured to receive a strap or belt. In still other embodiments, the attachment section can be coupled to an article's existing fastener.

The linking member can comprise an enclosed shape or can be an open shape. The linking member can be in any conceivable shape or form. In embodiments, the shape of the linking member comprises a triangle, square, rectangle, rhombus, parallelogram, trapezoid, pentagon, hexagon, heptagon, octagon, nonagon, decagon, circle, oval, half circle, or a quarter circle. The shape of the linking member may comprise a curve.

BRIEF DESCRIPTION OF THE DRAWINGS

So that the manner in which the present inventions can be better understood, certain illustrations, photographs, charts and/or flow charts are appended hereto. It is to be noted, however, that the drawings illustrate only selected embodiments of the inventions and are therefore not to be considered limiting of scope, for the inventions may admit to other equally effective embodiments and applications.

FIG. 9A shows a retaining member being positioned over a key section of a linking member in an embodiment.

FIG. 9B shows the keyhole section the FIG. 9A retaining member passing over the key section of the linking member.

FIG. 9C shows the retaining member of FIG. 9A after passing over the key section of the linking member. The retaining portion of the retaining member can be seen surrounding the key section of the linking member.

FIG. 9D Shows the retaining member of FIG. 9A surrounding the key section of the linking member and rotated in an upward orientation.

FIG. 9E shows the retaining member of FIG. 9A in a locked angular position on the linking member.

FIG. 10A is a perspective view of the fastening system in another embodiment. The linking member and retaining member of FIG. 9 are show in the locked orientation of FIG. 9C. A second retaining member can be seen disposed over the rotating section of the linking member.

FIG. 10B shows the fastening system of FIG. 10A with the second retraining member being rotated in a downward position.

FIG. 10C shows an alternative view of the fastening system of FIG. 10A. A second linking member is shown disposed beneath the keyhole section of the second retaining member.

In FIG. 11B, the linking member is disposed within a second retaining portion of the retaining member. In FIG. 11C, the linking member is shown about halfway between the second retaining portion and the third retaining portion of the retaining member. FIG. 11D shows the quick-release section of the linking member attached to the third retaining portion of the retaining member.

In FIG. 13A, the retaining member is shown perpendicular to the linking member with the keyholes of the retaining member disposed over the key section of the linking member. FIG. 13B shows the retaining member with the retaining portion engaging the key section of the linking member. FIG. 13C shows retaining member in a locked position and coupled the linking member.

In FIG. 17A, the locking clip is shown exploded above a key section of each of the linking members. FIG. 17B shows the locking clip with its keyhole sections surrounding the key section of the two linking members. FIG. 17C provides a top perspective view of the linking members with the locking clip in place over the key section. In FIG. 17D the locking clip is in the locked position. FIG. 17E, provides a top view of the two linking members secured to one another.

FIG. 20A shows the retaining member with the retaining portion surrounding the body of the linking member. FIG. 20B shows the retaining member sliding along the body of the linking member toward the rotating section. FIG. 20C shows the retaining member with the retaining portion disposed over the rotating section.

FIG. 21A is a top perspective view of a retaining member lying flat (left) next to a linking member (right). FIG. 21B provides a top view of the retaining member in an upright position with a retaining portion surrounding the linking member. FIG. 21C shows the retaining member in an unlocked position on the linking member. FIG. 21D shows the retaining member disposed within two notches of the linking member to assume a locked, angular position.

DETAILED DESCRIPTION OF CERTAIN EMBODIMENTS

Figure 1:
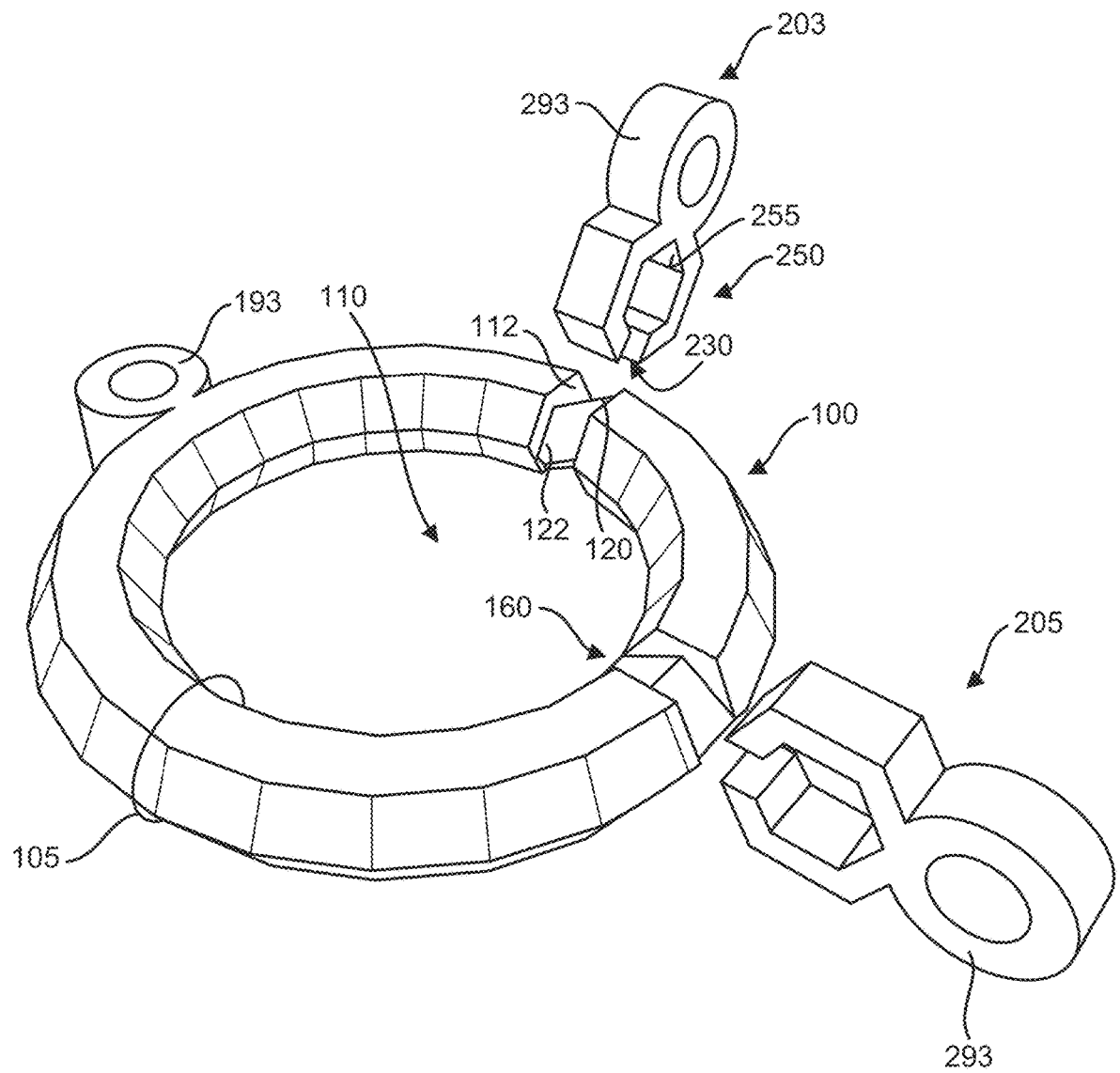
FIG. 1 represents a top perspective view of a fastening system in accordance with an embodiment of the present invention. A single linking member is shown with a retaining member exploded over the key section of the linking member and a second retaining member exploded over the quick release section of the linking member.

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate manner.

Definitions

The singular forms "a," "an," and "the" include plural reference unless the context clearly dictates otherwise. The use of the word "a" or "an" when used in conjunction with the term "comprising" in the claims and/or the specification may mean "one," but it is also consistent with the meaning of "one or more," "at least one," and "one or more than one."

Wherever any of the phrases "for example," "such as," "including" and the like are used herein, the phrase "and without limitation" is understood to follow unless explicitly stated otherwise. Similarly "an example," "exemplary" and the like are understood to be non-limiting.

The term "substantially" allows for deviations from the descriptor that do not negatively impact the intended purpose. Descriptive terms are understood to be modified by the term "substantially" even if the word "substantially" is not explicitly recited. Therefore, for example, the phrase "wherein the lever extends vertically" means "wherein the lever extends substantially vertically" so long as a precise vertical arrangement is not necessary for the lever to perform its function.

The terms "comprising" and "including" and "having" and "involving" (and similarly "comprises," "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a process involving steps a, b, and c" means that the process includes at least steps a, b and c. Wherever the terms "a" or "an" are used, "one or more" is understood, unless such interpretation is nonsensical in context.

As used herein the term "about" is used to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Description of Selected Specific Embodiments

A fastening system is provided herein. The fastening system employs at least one linking member and a retaining member configured to be fastened to one another. The fastening system permits guided fastening and unfastening of the linking and retaining members. Embodiments also permit rapid coupling and uncoupling of the linking and retaining members.

FIG. 1 is a first perspective view of an illustrative fastening system in accordance with one embodiment of the present invention. As illustrated, the embodiment comprises a single linking member 100 and two retaining members 203, 205. The linking member 100 comprises an internal circumference and an external circumference, and the internal circumference defines an internal space 110. The linking member 100 is comprised of a continuous cylindrical or polyhedral body 105 that creates an enclosed, generally circular shape. One retaining member 203 is shown with its keyhole section 230 oriented over the key section 120 of the linking member 100. Another retaining member 205 is shown with its keyhole oriented over the quick-release section 160 of the linking member 100.

The linking member 100 of the FIG. 1 embodiment comprises a polyhedral body 105 with a hexagonal cross-sectional shape 112. The retaining members 203, 205, each comprise a retaining portion 250, and the retaining portion 250 has a faceted interior circumference 255 that is complementary to the hexagonal cross-sectional shape 112 of the linking member 100. The faceted interior circumference 255 of the retaining portion 250 is complementary to the cross-sectional shape 112 of the linking member 100 such that the retaining members 203, 205 can slide onto the linking member 100 and be secured in a given angular position in relation to the linking member 100 (see FIG. 3). The retaining member 203, 205 also includes a keyhole 230 whose opening is complementary to the faceted cross sectional shape 122 of the linking member's key section 120. The complementary relationship between the keyhole 230 and the key section 120 allows for guided entry of the retaining member 203, 205 onto the key section 120 of the linking member 100. In this way, the retaining portion 250 of the retaining member 203, 205 surrounds the key section 120 of the linking member (see the configuration of FIG. 2). After being so disposed, the retaining member 203, 205 can then slide laterally such that the retaining portion 250 surrounds the polyhedral body 105 of the linking member 100.

Although the shape of the FIG. 1 linking member 100 is generally circular, in alternative embodiments, the linking member 100 comprises any shape, whether enclosed or open. In embodiments, the shape may be elliptical, circular, or polygonal. In certain embodiments, the shape of the linking member 100 comprises a rhombus, parallelogram, or trapezoid. The shape of the linking member 100 can comprise a triangle, square, rectangle, pentagon, hexagon, heptagon, octagon, nonagon, decagon, circle, oval, half circle, quarter circle. The linking member of certain embodiments comprises a shape that includes one or more arcs, parabolas, or hyperbolas. In embodiments, the linking member is D-shaped. The linking member can be C-shaped. In alternative embodiments, the linking member is B-shaped. Embodiments can comprise a linking member that cane-shaped. The linking member can be spiral in shape. The linking member can be a generally linear in shape.

The key section and complementary keyhole allow for guided entry of the retaining member onto the linking member and prevent the linking member and retaining member from being unintentionally uncoupled from one another. Linking members can comprise more than one key section. Linking member can comprise between one and twenty key sections. In embodiments, linking members comprise up ten key sections. Linking member can comprise one, two, three, four, five, six, seven, eight, nine, or ten key sections.

The quick-release section permits rapid coupling and uncoupling of the retaining member and the linking member. In embodiments, the quick-release section allows the retaining member to be attached/detached from the linking member through the application of shear force by pulling the retaining member, linking member, or both in a direction opposite the other. In this way, the retaining member can be quickly freed from the linking member and vice versa without necessitating use of guided entry or exit via the key/keyhole mechanism described herein. The amount of force required to couple/uncouple the fastening system through quick-release section can vary according to the required usage. Certain embodiments comprise a retaining member or quick-release section that allows for the user to select a given amount of force required for attachment/detachment of the retaining member (exemplary embodiment at FIG. 11). In one embodiment, the amount of force required is that which would permit an average adult male to easily couple or uncouple the fastening system. In an alternative embodiment, the force required is that which would permit an average elderly individual to easily couple or uncouple the fasting system. In yet another embodiment, the amount of force required is that which would permit an average ten-year-old child to easily couple or uncouple the fastening system. Certain embodiments are configured with one or more quick-release sections that permit rapid uncoupling of the retaining member and linking member when the fastened article is caught in machinery or otherwise prevents a wearer from escaping danger (see FIGS. 12-14). In embodiments, about one to one hundred pounds, inclusive, of pressure are required to uncouple the fastening system. Certain embodiments require from about one to about fifty pounds of pressure for uncoupling. Alternate embodiments require between about ten to about thirty pounds of pressure to uncouple via the quick-release section. Embodiments may require about ten, about twenty, about thirty, about forty, or about fifty pound of pressure to allow for uncoupling of the linking members and retaining members. In certain embodiments, the retaining member can be uncoupled from the body of the linking member under a given force, without the need for a designated quick-release section. Any values or descriptions related to coupling or uncoupling of the linking members and retaining members or the fastening system discussed herein also apply to coupling or uncoupling of two or more linking members in appropriate embodiments. In certain embodiments, the key sections or rotating sections are configured to also serve as quick-release sections.

Figure 2:
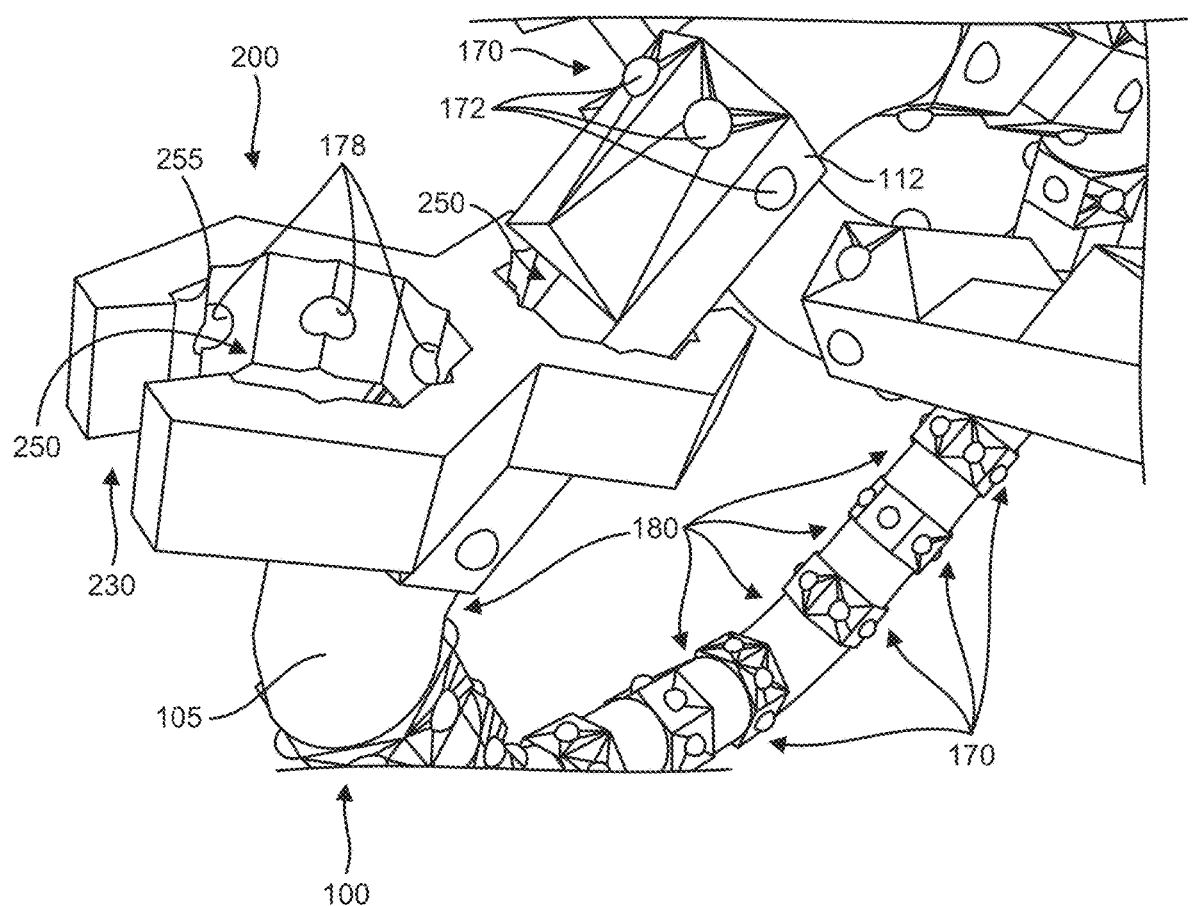
FIG. 2 provides a top perspective detailed view of a linking member in accordance with an embodiment of the present invention. A retaining member can be seen attached to the key section of the linking member.

FIG. 2 offers a detailed view of a linking member 100 and a retaining member 200 in accordance with another embodiment. The FIG. 2 embodiment shows a retaining member 200 with two retaining portions 250 that are opposite one another. The retaining member 200 is shown with one of the retaining portions 250 surrounding the key section of the linking member 100. In this embodiment, the linking member 100 includes series of docking sections 170 that alternative with rotating sections 180 along the body of the linking member 105. The rotating sections 180 of the FIG. 2 embodiment are generally cylindrical with a substantially circular cross-sectional shape. When disposed over a rotating section 180, the retaining portion 250 can rotate up to 3600 around the body 105 of the linking member 100, which serves as the axis of rotation.

In the FIG. 2 embodiment, the docking sections 170 comprise a hexagonal cross-sectional shape 112, and further comprise a raised texture 172 or "bumps" along the circumference of the docking section 170. As shown, the retaining portion 250 of the retaining member 200 comprises an internal circumference 255 with a recessed texture 178 or "dimples" that are complementary to the raised texture 172 or "bumps" of the docking section 170. The retaining member 200 can slide along the circumference of the linking member 100 and be positioned over a docking section 170, which serves to secure the retaining member 200 in a given angular position relative to the linking member 100. When the docking section 170 comprises such a raised texture 172, the retaining member 200 can be positioned over the docking section 170 through the application of lateral pressure on the walls of the retaining portion 250 such that the retaining member 200 snaps into place over the docking section 170. The reciprocal interaction between the raised texture 172 on the docking section 170 and the recessed texture 178 on the internal circumference 255 of the retaining portion 250 helps anchor the retaining member 200 in the chosen angular position and further prevents the retaining member 200 from sliding laterally along the circumference of the linking member 100. In this way, the retaining member 200 is in a "locked position" relative to the linking member 100. The retaining member 200 can be released from "locked position" through the application of lateral pressure on the walls of the retaining portion 250 that surrounds the docking section 170. Such pressure allows the recessed texture 178 of the retaining portion 250 to slide off of the raised texture 172 of the docking section 170. The pressure required to release or engage the retaining member 200 in the locked position can vary or be adjusted to the requirements of the user.

In FIG. 2, the raised texture generally comprises a half-dome shape; however, any conceivable shape that creates a raised texture can be used in alternative embodiments. Likewise, the recessed texture can be any conceivable shape that is complementary to the raised texture. In the FIG. 2 embodiment, the raised texture 172 is disposed up on the linking member 100, and the recessed texture 178 is disposed upon the internal circumference of or the retaining member 255. In alternative embodiments, the raised texture 172 is disposed up on the internal circumference of or the retaining member 255, and the recessed texture 178 is disposed upon the linking member 100. In still other embodiments, both a raised texture 172 and a recessed texture 172 are disposed on the linking member 100 and the retaining member 200. In such embodiments, the raised texture 172 may alternative with the recessed texture 172 along the circumference of the surface on which the textures are disposed.

Figure 3:
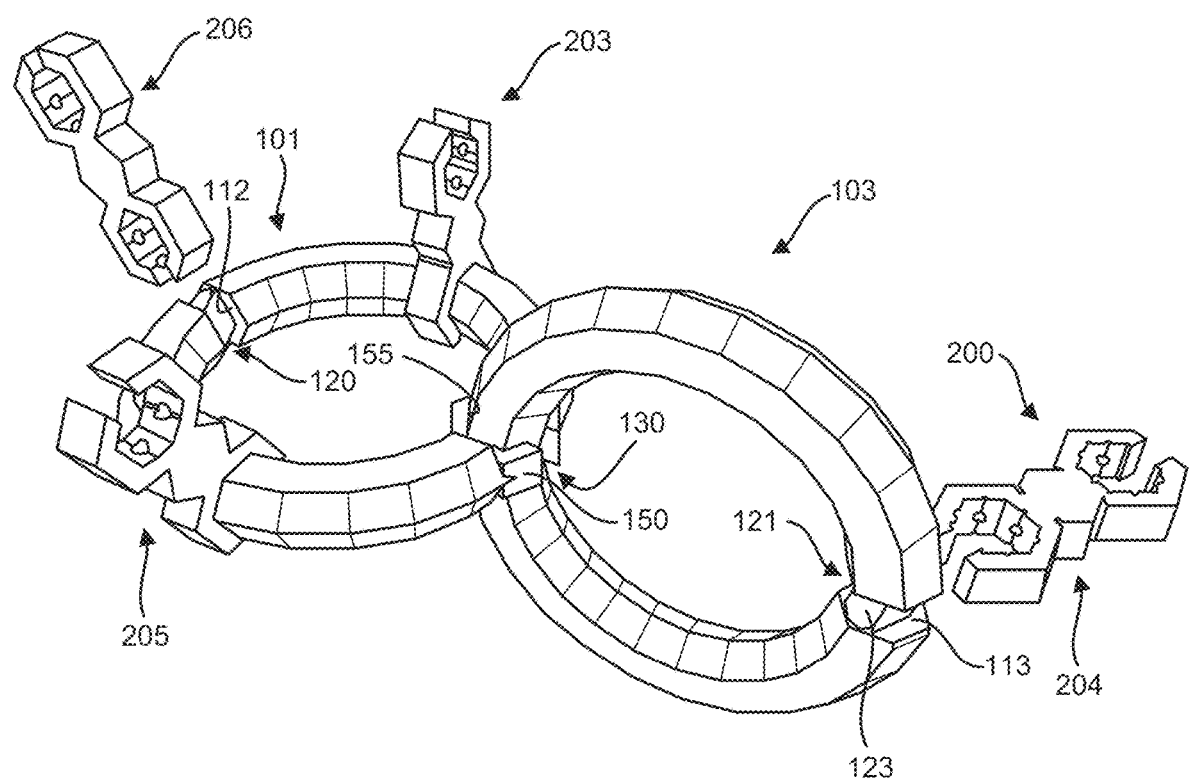
FIG. 3 shows a top perspective view of an alternative embodiment of the present invention. Two linking members are shown coupled to one another. Two retaining members are also shown attached to one linking member and two other retaining members can be seen with their keyhole sections oriented over the key sections of the two linking members.

FIG. 3 shows an alternative embodiment of the present invention that comprises two linking members 101, 103 coupled to one another. Two retaining members 203, 205 are also shown attached to one linking member 101 and two other retaining members 204, 206 can be seen with their keyhole sections oriented over the key sections 120, 121 of the two linking members 101, 103. One linking member 101 further includes a retaining portion 150 with an internal circumference 155 that is complementary to the cross-sectional shape 113 of the other linking member 103. The retaining portion 150 of the one linking member 101 also comprises a keyhole 130 that is complementary to the cross-sectional shape 123 of the key section 121 of the other retaining member 103. Thus, the one linking member 101 is configured to receive the other linking member 103, and the other linking member 103 can be secured at a given angular orientation relative to the one linking member 101 in the manner previously described with regard to the retaining members 203, 205.

Figure 4:
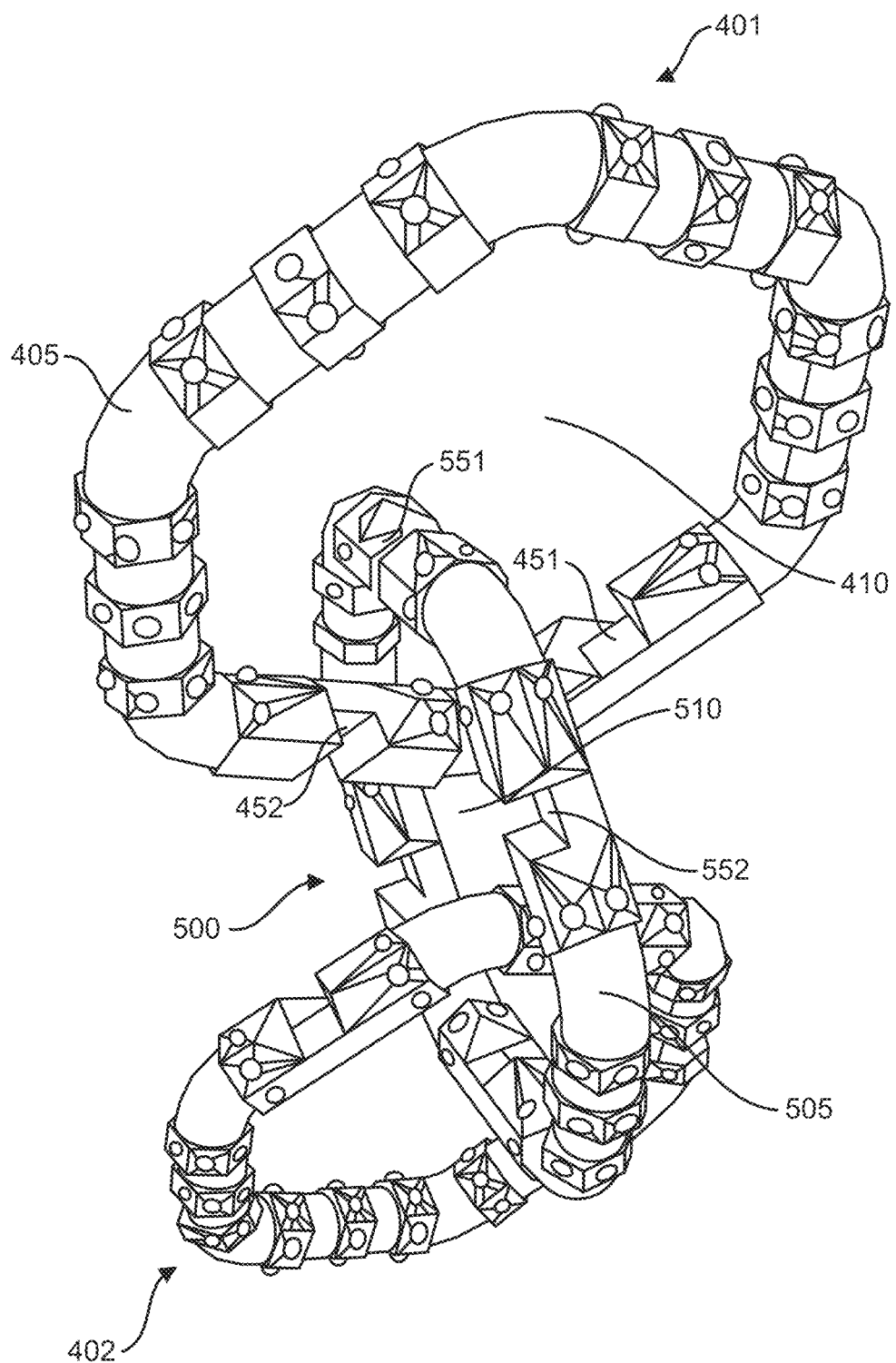
FIG. 4 provides a top perspective view of yet another embodiment of the present invention. Three interconnected linking members are shown in an unpacked configuration.

FIG. 4 provides a perspective view of an alternative aspect of the present invention. The figure shows three interconnected linking members 401, 500, 402 linked together in a chain-like configuration. Each of the linking members comprises an interior space 410, 510, and a body 405, 505. As shown, the body 405 of a first linking member 401 passes through the interior space 510 of a second linking member 500, and the body of the second linking member 505 passes through the interior space 410 of the first linking member 401 and a third linking member 402. In this way, the linking members 401, 500, 402 are permanently secured together in the chain-like configuration. Embodiments are also envisioned wherein the members are non-permanently coupled to one another.

In the FIG. 4 embodiment, each of the linking members comprises a pair of notches 451, 452, 551, 552. Each pair of notches is configured such that the opening of one notch in the pair 451, 551 faces a direction opposite the opening of the other notch 452, 552, in the pair. For simplicity, these are referred to as an upward facing notch 451, 551, and a downward facing notch 452, 552 with the understanding that, in practice, the notches can face any direction. The downward facing notch 452 of the first linking member 401 is oriented and configured to receive the upward facing notch 551 of the second linking member 500. The reciprocal is also true, namely, the upward facing notch 451 of the first linking member 401 is oriented and configured to receive the downward facing notch 552 of the second linking member 500. As shown, the second linking member 500 also comprises an additional pair of notches that are complementary to the notches of the third linking member 402.

Figure 5:
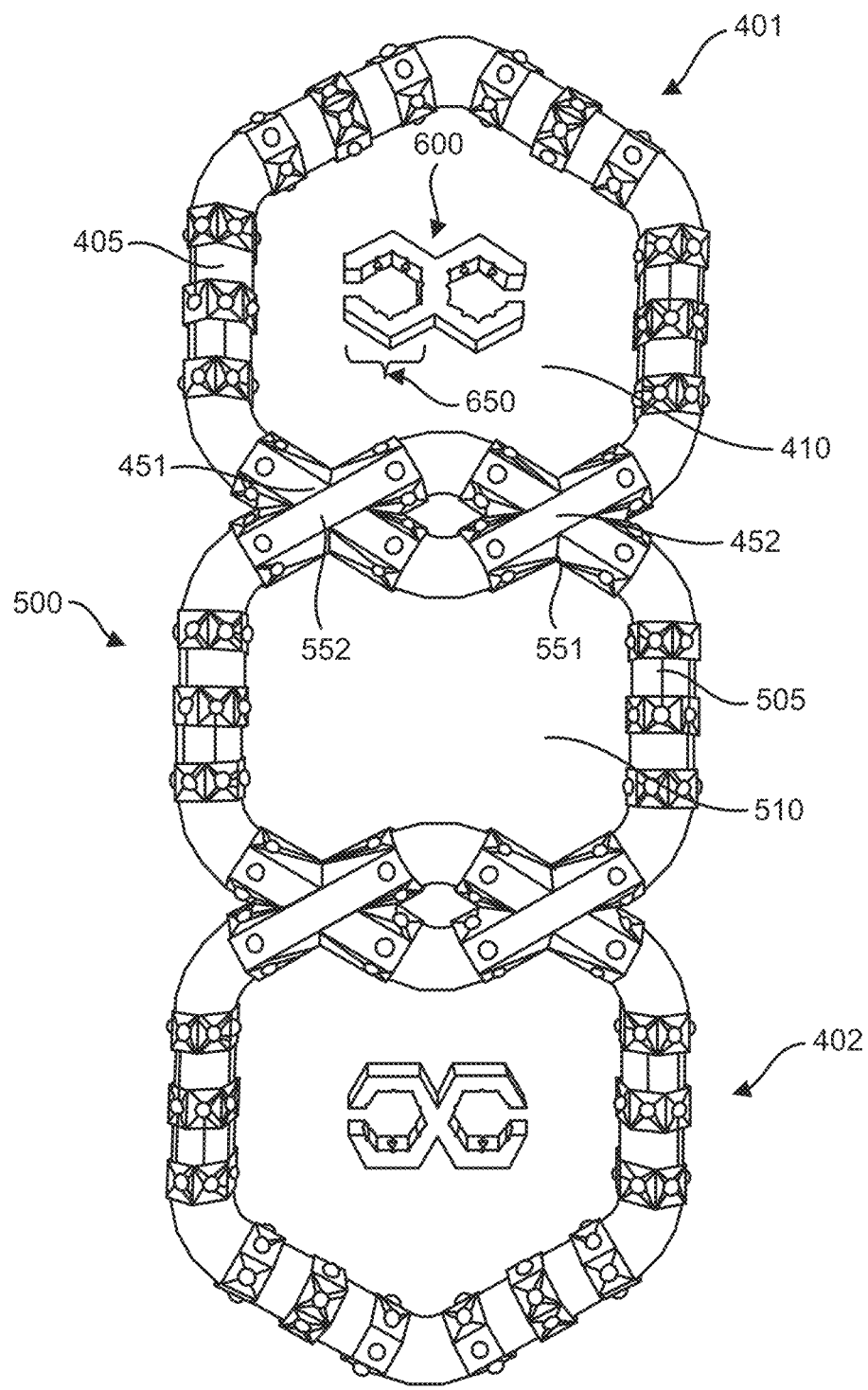
FIG. 5 shows a front view of the linking members of FIG. 4 lying flat in a packed configuration. Also shown are two unattached retaining members.

The notches 451, 452, 551, 552 are configured such that, when the complementary notches on adjacent interconnected linking members are joined, the joined linking members are no longer in an unpacked, chain-like configuration relative to one another but lie in the same linear plane (see FIG. 5).

FIG. 5 shows the linking members of FIG. 4 with the complementary notches 451, 552 & 452, 551 of the linking members 401, 500, 402 joined together such that the linking members lie flat in a packed configuration. Two unattached retaining member 600 are also shown within the interior space 410 of the linking members 401, 402.

The openings of the notches 451, 452, 551, 552 extend into the body 405, 505 of the linking members to a depth sufficient to allow the linking members to lie in single linear plane when in the packed configuration of FIG. 5. Such a packed configuration significantly reduces the amount of space occupied by the interconnected linking members.

Although FIGS. 4 and 5 show embodiments with three interconnected linking members, alternative embodiments can comprise any number of interconnected linking members. Embodiments may comprise over one hundred linking members. Other embodiments can comprise between fifty and one hundred linking members. Still other embodiments comprise between twenty-five and fifty linking members. Embodiments can include up to 25 linking members. In embodiments, there are two, three, four, five, six, seven, eight, nine, ten, eleven, twelve, thirteen, fourteen, or fifteen linking members.

FIGS. 4 and 5 provide linking members with either one or two pairs of notches.

Alternate embodiments may comprise up to ten pairs of notches on a single linking member. Embodiments are envisioned with one, two, three, four, five, six, seven, eight, nine, or ten pairs of notches on a single linking member.

In addition to fastening systems, embodiments that comprise the pack-flat mechanisms of FIGS. 4 and 5 can be configured for a multiplicity of uses. Under one embodiment, the interlocked linking members are configured to transmit electricity. In such an embodiment, electricity is conducted across the system only when two or more of the linking members assume the flat-packed configuration, an example of which is shown in FIG. 5. Alternate embodiments can be configured to serve as fishing nets, antennae, emergency shelters, business cards, hammocks, grills, or other useful configurations.

Figure 6A:
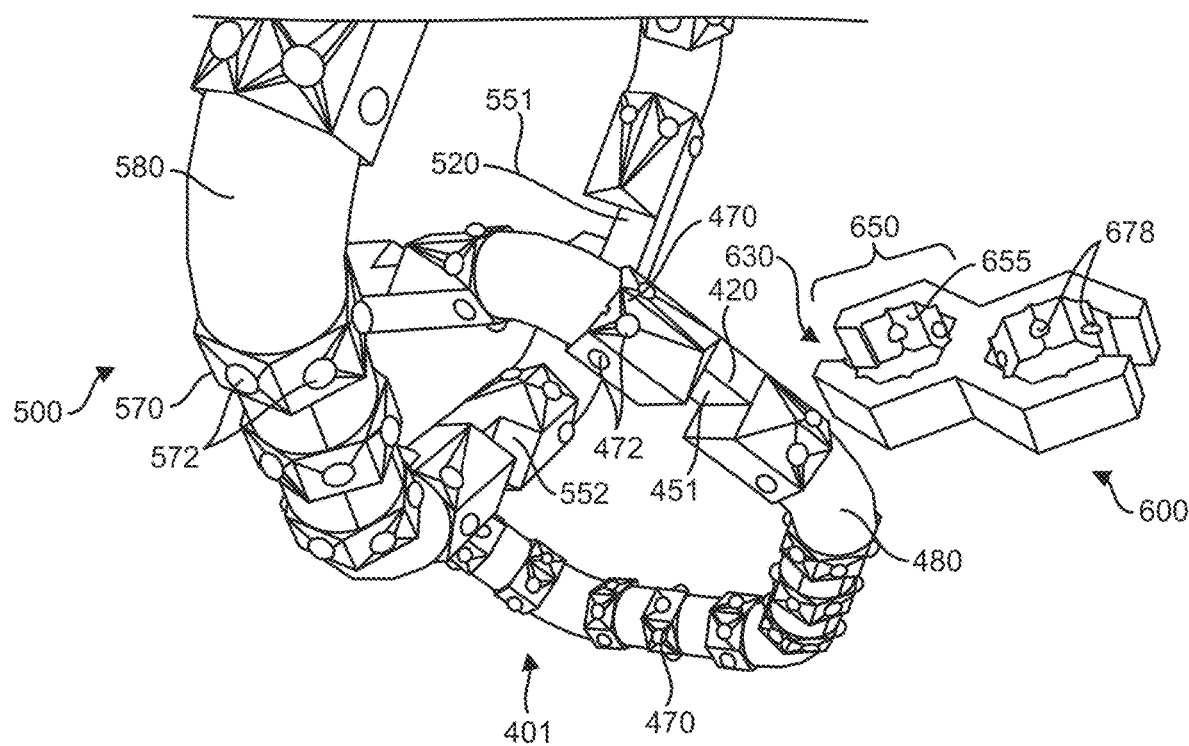
FIG. 6A represents an alternative top perspective view of two linking members of FIG. 4 in an unpacked configuration. A retaining member is shown with its keyhole section oriented toward a key section of one linking member.

FIG. 6A shows a more detailed view of two linking members 401, 500 from FIG. 4 in an unpacked configuration. Rotating sections 580, 480 and docking sections 570 with raised textures 572 are visible along the linking members 401, 500. This orientation more clearly shows the complementary relationship between the upward facing notch 451 of the first linking member 401 and the downward facing notch 552 of the second linking member 500. In the FIG. 6A embodiment, the notches 451, 552 also serve as key sections 420, 520 that allow that for guided coupling of the retaining member 600. In certain embodiments, the notches 451, 452, 551, 552 are configured to serve as quick-release sections 160. A retaining member 600 is shown with its keyhole 630 oriented toward the key section 420 of one linking member 401. The retaining member 600 comprises two retaining portions 650, each with an internal circumference 655 that is complementary to the hexagonal cross-sectional shape of the docking stations 470, 570. The retaining member further comprises a recessed texture 678 that is complementary to the raised texture 572 of the linking members.

Figure 6B:
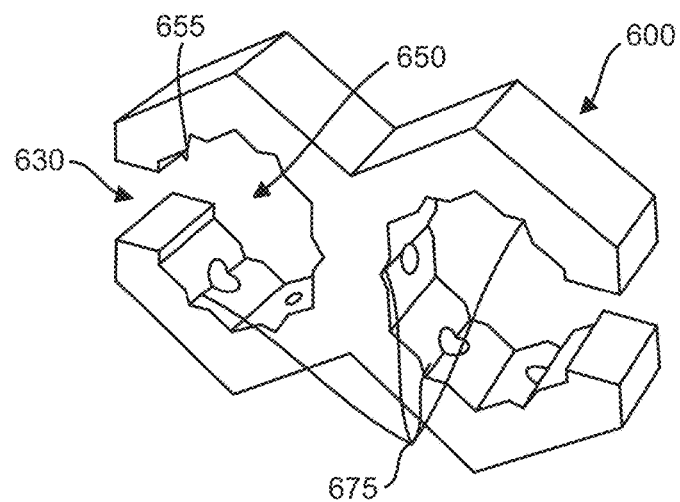
FIG. 6B shows a detailed view of the FIG. 6A retaining member.

FIG. 6B shows a detailed view of the retaining member 600 of FIG. 6A. This view shows a retaining member 600 that comprises additional grooves 675 to increase the number of angles of which the retaining member 600 can be oriented upon a linking member. In the pictured embodiment, the retaining member 600 comprises two retaining portions 650, each with an internal circumference that includes five sides and an open side that serves as a keyhole 630. A groove 675 is disposed at about the midpoint of each side of the internal circumference 655. These grooves 675 effectively double the number of secured angular orientations the retaining member 600 can assume in relation to a linking member. Thus, in embodiments with hexagonal linking members such as FIG. 6, the grooved retaining member 600 can achieve up to twelve angular orientations. Compare this to the FIG. 1 embodiment, wherein non-grooved retaining members 203, 205 can achieve a maximum of only six angular orientations along the hexagonal, polyhedral body 105 of the linking member 100.

Not intending to be bound by theory, embodiments can contain any number of grooves that are physically capable of being inserted into the internal circumference of a retaining portion. In certain embodiments, the number of grooves correlates with the number of sides in the internal circumference of the retaining portion. In alternative embodiments grooves permit a locked angular orientation to be achieved when the retaining member comprises a generally circular internal circumference.

Although a hexagonal cross-sectional shape 112 is shown in the XX embodiments, alternative embodiments can comprise any elliptical, circular, or polygonal shape. In certain embodiments, the cross-sectional shape 112 of the linking member 100 comprises a rhombus, parallelogram, or trapezoid. The cross-sectional shape 112 of the linking member 112 can comprise a triangle, square, rectangle, pentagon, hexagon, heptagon, octagon, nonagon, decagon, circle, oval, half circle, quarter circle, or a combination thereof.

Figure 7:
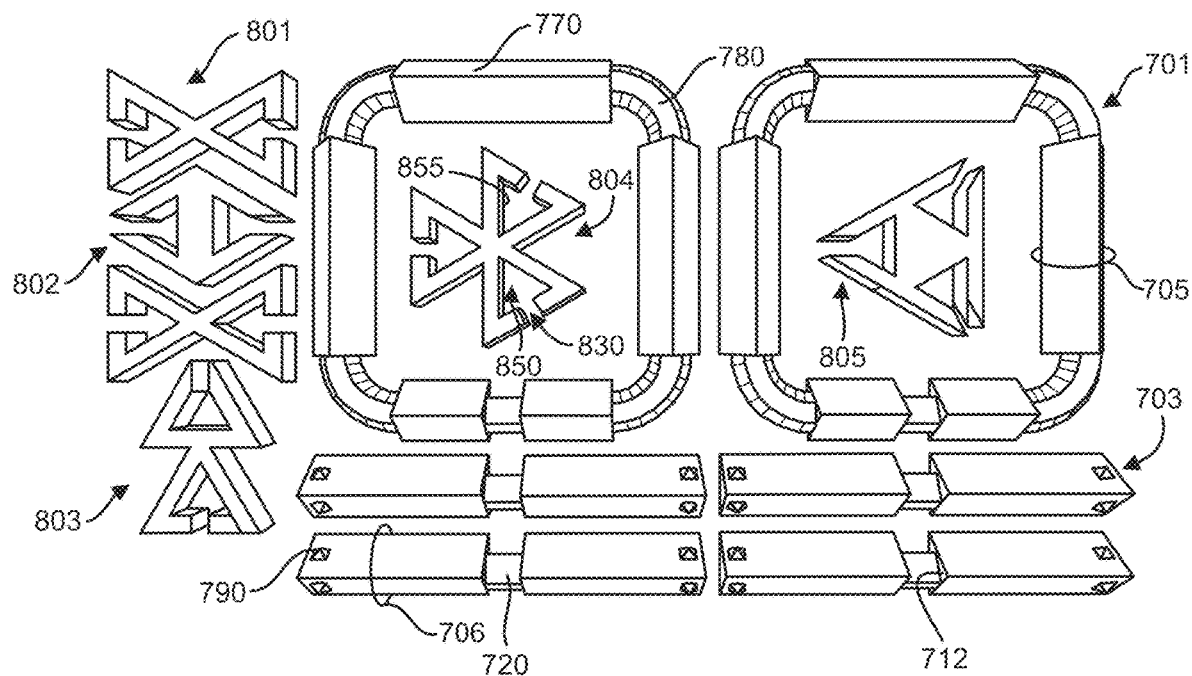
FIG. 7 shows a deconstructed view of a fastening system under one embodiment. Multiple linking members and retaining members of varying types are shown.

FIG. 7 shows a deconstructed view of a fastening system under an alternative embodiment. The linking members 701, 703 include docking sections 770 and rotating sections 780. In this embodiment, the docking sections 170 comprise a triangular cross-sectional shape 712, and the rotating sections 780 have a hexagonal cross-sectional shape.

In the FIG. 7 embodiment, the system includes linking members 701 with continuous polyhedral bodies 705 that create an enclosed, generally square shape with rounded corners. The system also includes linking members 703 with non-continuous polyhedral bodies 706 that are not enclosed. The non-enclosed linking members 703 comprise barriers 790 configured to prevent a retaining member that is coupled to linking member 703 from sliding off an opened end. In embodiments, the barriers 790 comprise a raised texture. In alternative embodiments, the barriers 790 comprise walls, end caps, or any other means sufficient to ensure that the retaining member does slide off an otherwise open end. The barrier 790 may be removable or permanent affixed to the otherwise open end of the linking member.

FIG. 7 also offers retaining members 801, 802, 803, 804, 805 of varying configurations. The retaining member each comprises at least one retaining portion 850, and each retaining portion 850 further comprises at least one keyhole 830. Each retaining portion 850 has an internal circumference 855 that is complementary to the cross-sectional shape 712 of docking stations 770. In the FIG. 7 embodiment, the internal circumference 855 of the retaining portion 850 is generally triangular in shape; however the internal circumference of alternative embodiments can contain any polygonal, circular, or elliptical shape. A bow-shaped retaining member 801 is provided with two triangular retaining portions, wherein the peaks of the two triangles are oriented toward one another. A diamond-shaped retaining member 802 is also shown with two triangular retaining portions, wherein the bases of the two triangles are oriented toward one another. A stacked retaining member 803 is shown with one triangular retaining portion stacked on the other. A retaining member with three retaining portions 804 is shown wherein the peaks of the three triangles are oriented toward one another. The FIG. 7 system also offers a generally triangular-shaped retaining member comprising three triangular retaining portions, wherein the bases of the triangles are oriented toward the middle of the retaining member 805.

Figure 8:
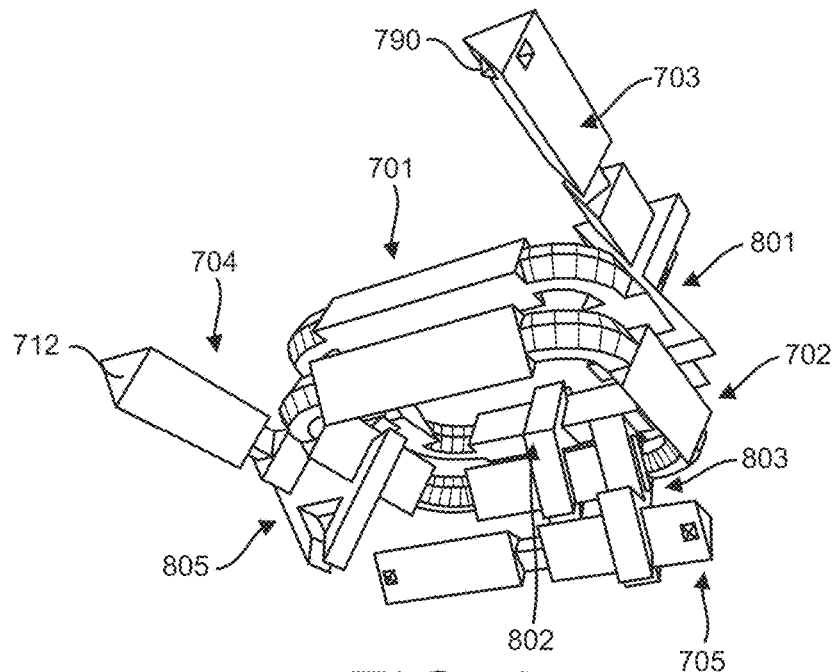
FIG. 8 provides a constructed fastening system under one embodiment that includes a number of the elements shown in FIG. 7.

FIG. 8 illustrates an exemplary manner by which many of the elements of FIG. 7 may be coupled together. Two generally square-shaped linking members 701, 702 are shown coupled to one another via a diamond-shaped retaining member 802. A bow-shaped retaining member 801 is shown coupling a non-enclosed linking member 703 to the top square-shaped linking member 701. The bottom square-shaped linking member 702 is coupled to a non-enclosed linking member 704 via the triangular-shaped retaining member 805. Yet another non-enclosed linking member 705 is connected to the bottom square-shaped linking member 702 through a stacked retaining member 803.

FIGS. 9A-9E provide sequential images of a retaining member 801 being secured onto a linking member 701 generally triangular-shaped docking stations 770 under one embodiment.

Figure 9A:
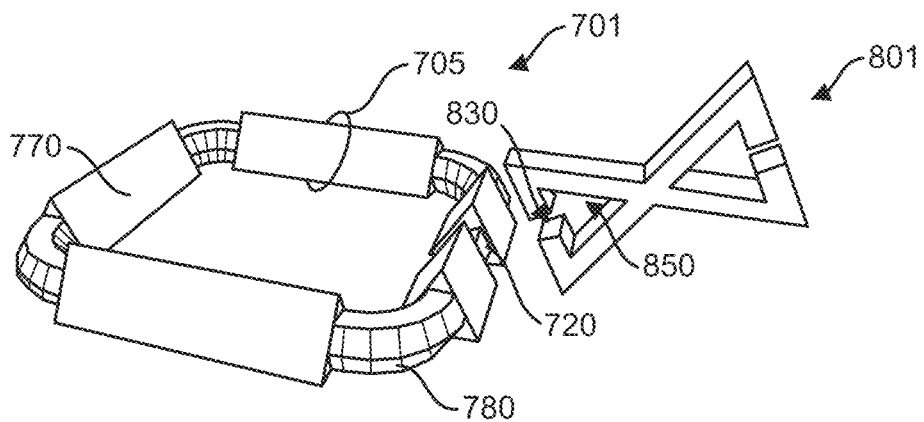
FIGS. 9A-9E provide sequential images of a retaining member being secured onto a linking member under one embodiment.

In the FIG. 9A embodiment, a bow-shaped retaining member 801 is positioned over a key section 720 of a linking member 701.

Figure 9B:
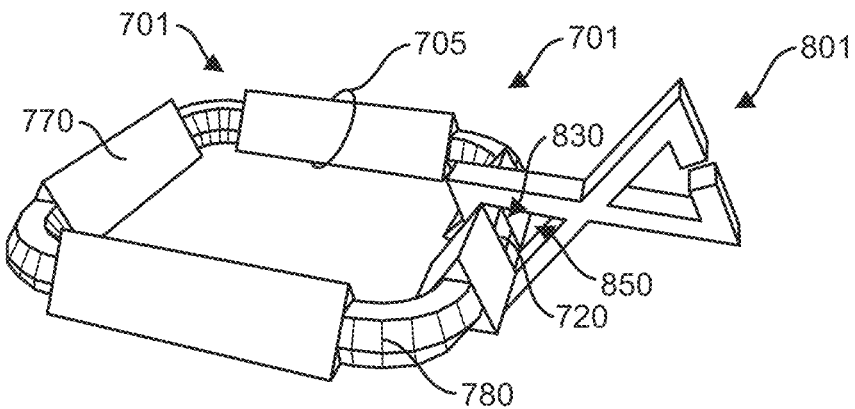

In FIG. 9B, the retaining member 801 is being guided onto the linking member 701. The keyhole 830 of the retaining member 801 is shown passing over the key section 720 of the linking member 701.

Figure 9C:
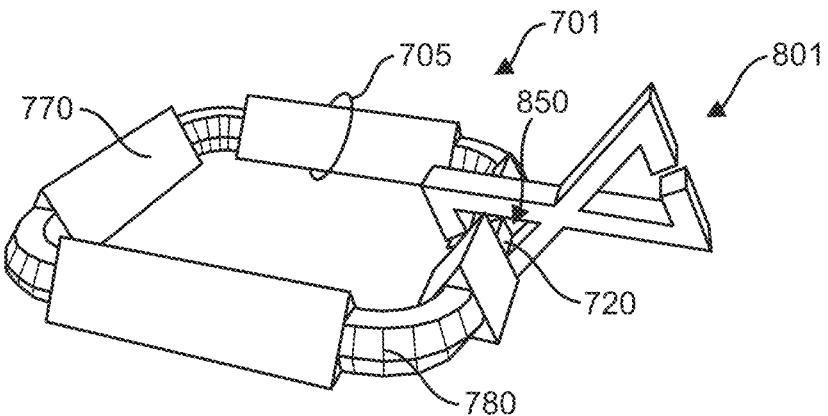

FIG. 9C shows the retaining member 801 of FIG. 9A after passing over the key section 720 of the linking member 701. The retaining portion 850 of the retaining member 801 now surrounds the key section 720 of the linking member 701. When so positioned, the retaining member can freely rotate around the key section 720 of the linking member 701. The retaining member 801 is oriented at an angle of about 300 in relation to the linking member 701.

Figure 9D:
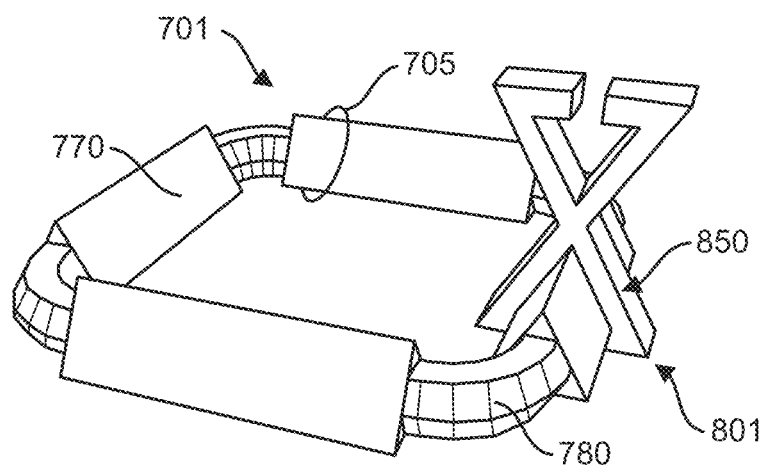

In FIG. 9D, the retaining member 801 is rotated counter-clockwise about 60° from the FIG. 9C orientation such that the retaining member 801 is now generally perpendicular to the linking member 701.

Figure 9E:
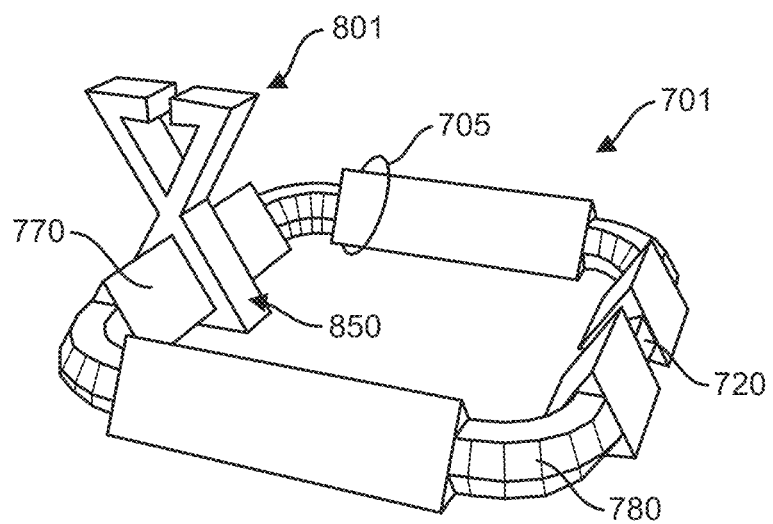

FIG. 9E shows the retaining member 801 in a locked angular position on a docking station 770 of the linking member 701. As can be seen, when so disposed upon a docking station 770, the retaining member 801 is not capable of rotating in relation to the linking member 701.

FIG. 10A provides a fastening system wherein the bow-shaped linking member 701 and the first retaining member 801 are show in the locked orientation of FIG. 9C. A diamond-shaped retaining member 802 can be seen with its first retaining portion 857 surrounding the rotating section 780 of the first linking member 701. The diamond-shaped retaining member 802 is oriented at about 30° in relation to the first linking member 701.

In FIG. 10B, the diamond-shaped retaining member 802 has been rotated clockwise on the rotating section 780 by about 120° from the FIG. 10A configuration. When so oriented, the diamond-shaped retaining member 802 is generally perpendicular to the first linking member 701 and assumes a downward position.

FIG. 10C shows an alternative view of the fastening system of FIG. 10A. A second linking member 702 is shown disposed beneath the second retaining portion 859 of the diamond-shaped retaining member 802. The keyhole 830 of the diamond-shaped retaining member 802 and the key section 720 of the second linking member 702 are generally aligned and oriented for further attachment.

Figure 11A:
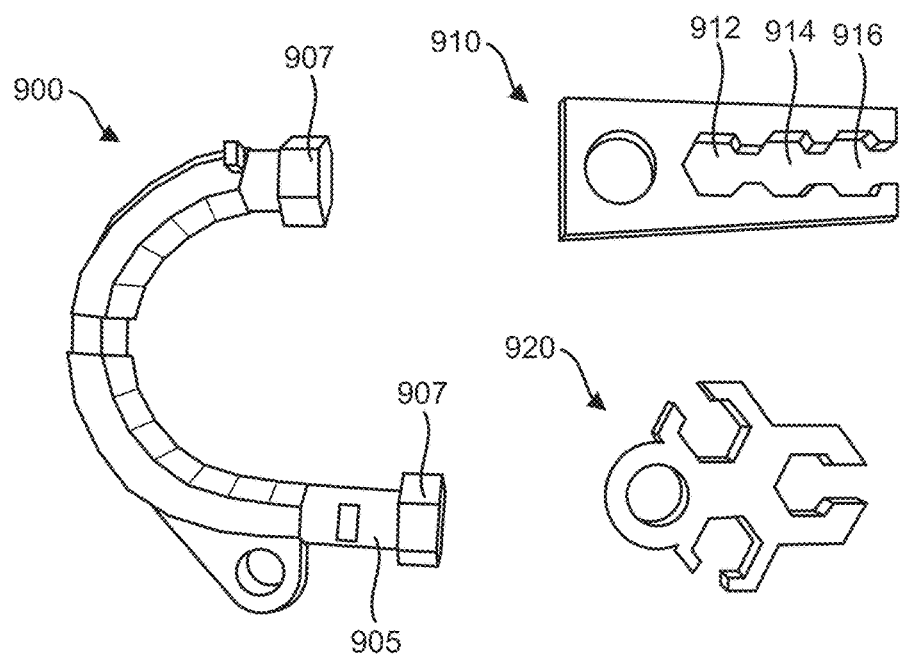
FIG. 11A shows an unassembled fastening system with two retaining members and a non-enclosed linking member, under one embodiment.

FIG. 11A provides fastening system with a non-enclosed linking member 900 and two retaining members 910, 920 under one embodiment. The linking member 900 comprises two end caps 907 that prevent the retaining members 910, 920 from sliding off the end of the linking member 900 when tethered thereto. The linking member 900 also includes a quick-release section 905.

The retaining members 910, 920 of FIG. 11A each comprise three retaining portions. The first retaining member 910 is configured such that each of the three retaining portions 912, 914, 916 can be attached or unattached using varying amounts of pressure.

Figure 11B:
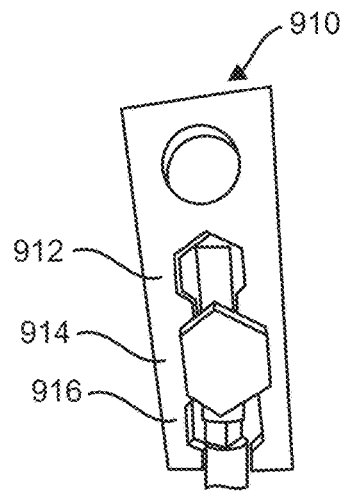
FIGS. 11B-11D provide sequential images of a retaining member being moved from a first position to a second position on the quick-release section of the FIG. 11A linking member.
Figure 11C:
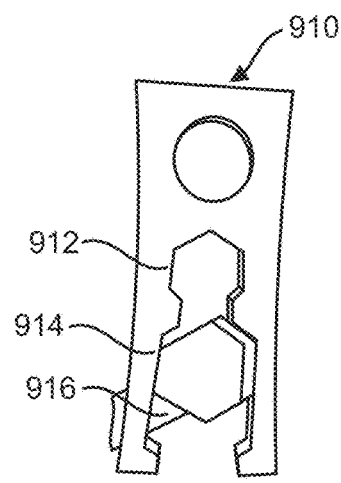
Figure 11D:
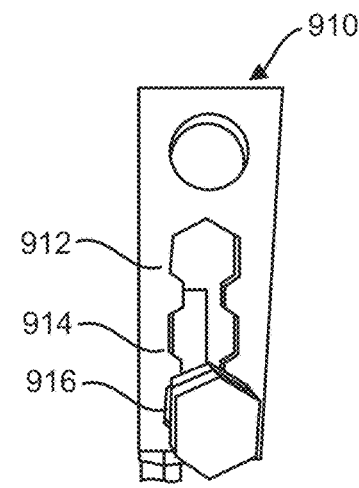

FIGS. 11B-11D show a retaining member 910 attached to the quick-release section 905 of the FIG. 11A linking member 900. As shown, in this embodiment, the retaining member 910 can alternate between different positions when tethered to the quick-release section 905. In FIG. 11B, the retaining member 910 is attached to the quick-release section 905 via the second retaining portion 914. FIG. 11C shows the linking member 900 about halfway between the second retaining portion 914 and the third retaining portion 916. FIG. 11C reveals that the open end of the retaining member 910 flexes as the retaining member 910 is moved from one position 914 to the next 916 or when the retaining member 910 is removed completely from the quick-release section 905. FIG. 11D shows the retaining member 910 attached to the quick-release section 905 via the third retaining portion 916. As can be seen due to the sequential configuration of the retaining portions along the body of the retaining member 910, the amount of force required to enter each of the retaining portions 912, 914, 916 increases as the distance from the keyhole increases. Thus, the force required to couple the first retaining portion 912 of the retaining member 910 to the quick release section 905 is less than the force required to move the retaining member 910 from the first retaining portion 912 to the second retaining portion 914. Likewise, the force required to move the retaining member 910 from the first retaining 912 portion to the second retaining portion 914 is less than the force required to move the retaining member 910 from the second retaining portion 914 to the third 916. In this way, an article can be more securely fasted or less securely fastened to the linking member 900 depending on which retaining portion is engaged with the quick-release section 905.

The linking member, retaining member, or both can comprise a means for attachment of the fastening system to another article, person, vehicle, tool, or device. In embodiments, the attachment section of the linking member, retaining member, or both is configured to be tied, hooked, clipped, or otherwise attached to an article, person, vehicle, tool, or device. In one embodiment, the attachment section (see FIG. 1 at 193, 293) comprises a generally circular, elliptical, or polygonal hole, gap, or notch. In alternative embodiments, the attachment section is configured to receive a strap or belt (see 1195 and 1295 of FIG. 14A). In still other embodiments, the attachment section can be coupled to existing fastening systems (see 1193, 1293 of FIGS. 12A & 14B).

Figure 12A:
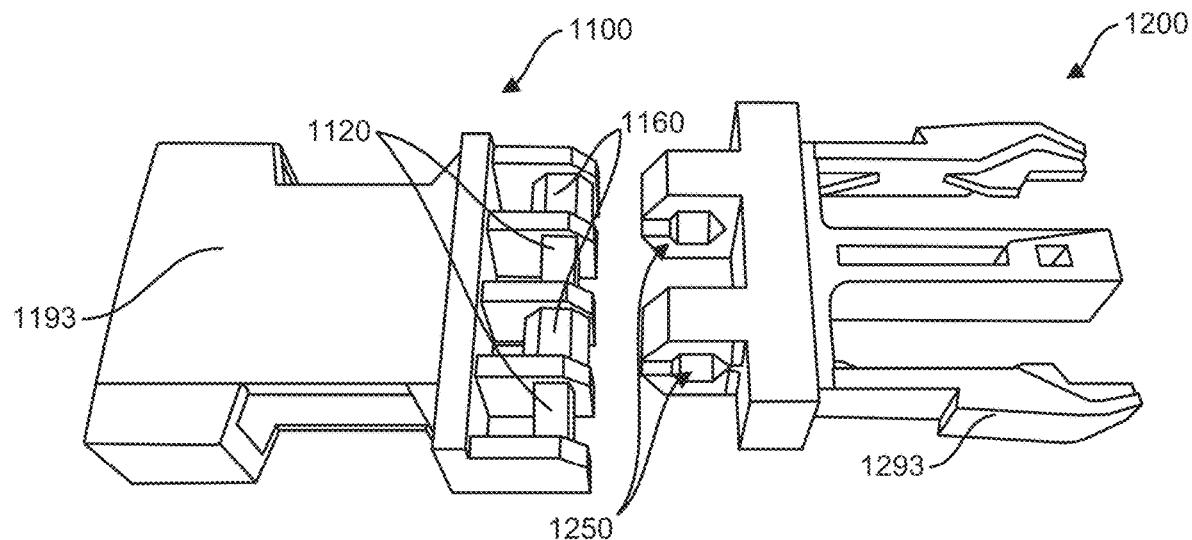
FIGS. 12A and 12B show a retaining member being attached to a quick-release section of a linking member under an alternative embodiment of the fastening system.
Figure 12B:
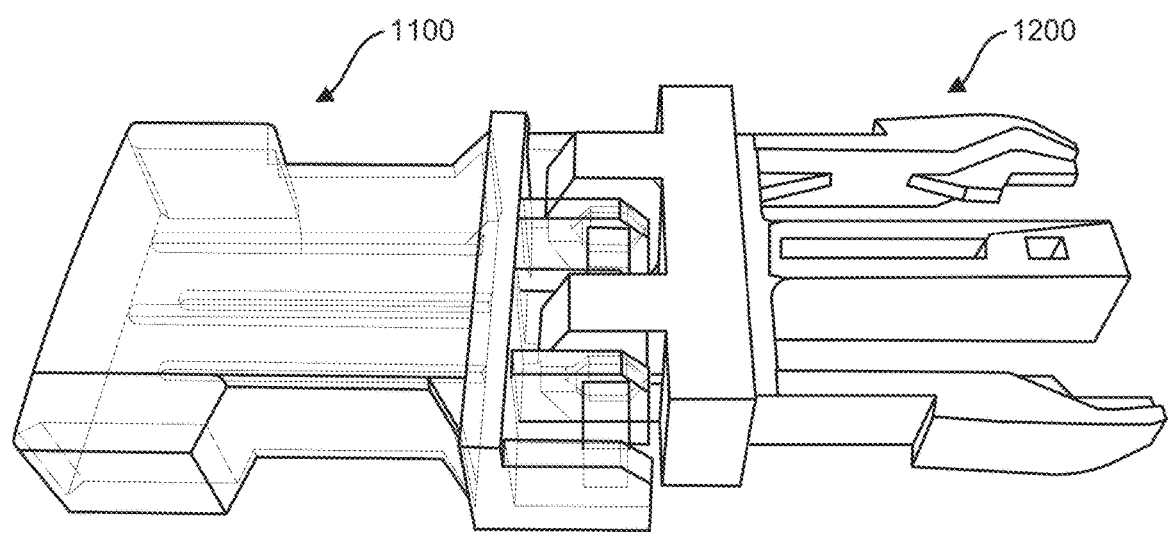

FIG. 12A provides an exemplary fastening system under one embodiment. A linking member 1100 is shown with two quick-release sections 1160 and two key sections 1120. The retaining member 1200 comprises two retaining portions 1250 that are spaced from one another such that the retaining portions 1250 can engage either the quick-release sections 1160 or the key sections 1120 of the linking member 1100. In FIG. 12A, the retaining member 1200 is positioned to engage the quick-release sections 1160 of the linking member 1100. In FIG. 12B, the retaining member 1200 is coupled to the linking member 1100. The linking member 1100 is shown as transparent to allow for a better view of the mechanism by which the retaining member 1200 connects to the quick-release section 1160. When coupled to the quick release section, the fastening system can provide a fail-safe mechanism, which allows for the linking member 1100 and the retaining member 1200 to be uncoupled from one another under shear force (discussed in more detail above). This arrangement may be particularly useful for embodiments that fasten helmets, protective gear, or other accessories to an individual. Allowing such fasteners to release under a given amount of force may protect the wearer from serious injury or death, particularly if the worn article becomes caught in machinery or otherwise presents a danger to the wearer.

Figures 13A, 13B:
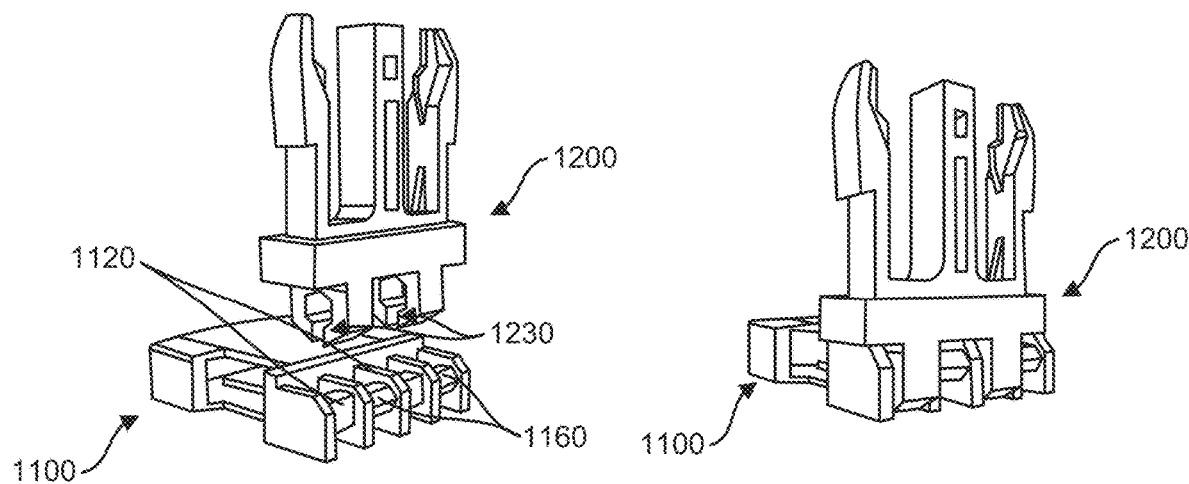
FIGS. 13A-13C show the linking member and retaining member of FIG. 12 being fastened via a guided entry and exit mechanism.
Figure 13C:
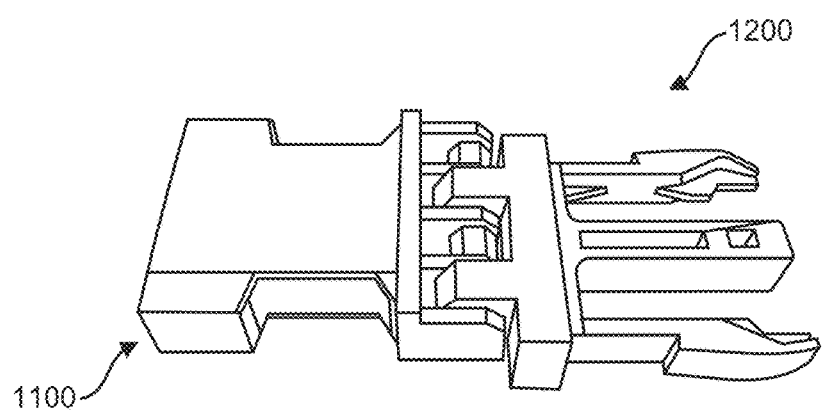

FIGS. 13A-13C show the linking member 1200 and retaining member 1100 of FIG. 12 being fastened via the key section 1120 of the linking member. In FIG. 13A, the retaining member 1200 is shown perpendicular to the linking member 1100 with the keyholes 1230 of the retaining member 1200 disposed over the key section 1120 of the linking member 1100. FIG. 13B shows the retaining member 1200 with the retaining portion engaging the key section of the linking member 1100. FIG. 13C shows retaining member rotated 90° with respect to the orientation of the retaining member in FIGS. 13A and 13B. In the FIG. 13C arrangement, the retaining member 1200 and linking member 1100 lie within the same linear plane and are locked together such that they cannot be uncoupled through shear forces in opposite directions.

In the FIG. 13 embodiment, the key section 1120 is comprised of a rectangular polyhedron that is taller than it is wide, and the keyhole 1230 comprises an opening that is just larger than the width of the key section 1120 but smaller than the height of the key section 1120. Thus, the keyhole 1230 easily passes over the width key section 1120 when perpendicular thereto. However, when the keyhole 1230 is no longer perpendicular to the key section 1120 (as in FIG. 13C), the height of the key section 1120 prevents the keyhole 1230 from passing over the key section 1120, and the retaining member 1200 and linking member 1100 become locked together. To unlink the retaining member 1200 and linking member 1100 from one another, the user simply rotates retaining member 1200, linking member 1100, or both such that the keyhole 1230 is once again aligned with the width of the key section 1120. In this orientation, the keyhole 1230 easily passes over the width of the key section 1120 allowing the retaining member 1200 and the linking member 1100 to be uncoupled from one another. Although a perpendicular orientation is required to attach or detach the retaining member from the linking member in the FIG. 13 embodiment, other embodiments comprise alternative orientations. Among other factors, the required orientation will vary depending on the shape, size, location, or configuration of the key section, key hole, retaining portion, or a combination thereof.

Figure 14A:
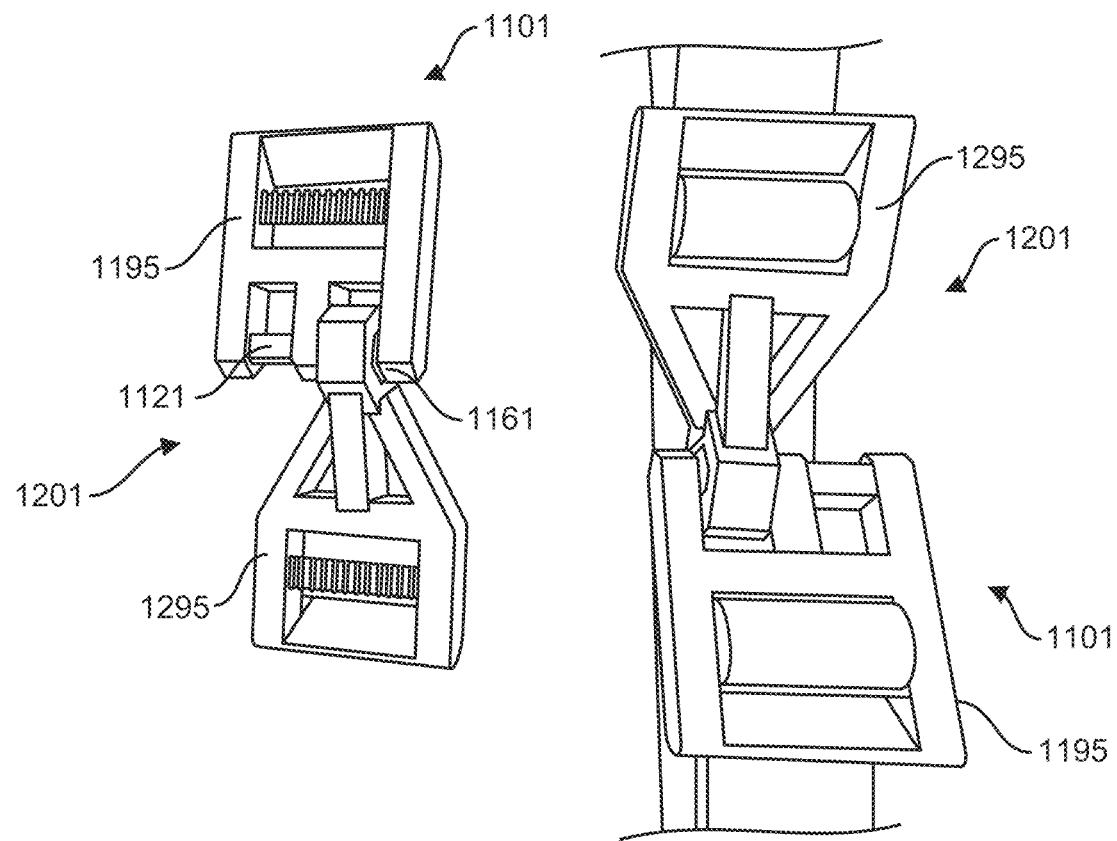
FIG. 14A provides top photographic views of a fastening system under another embodiment with an attachment mechanism that is configured to receive a belt or strap. The photographs show the embodiment with and without the associated belt or strap.

FIG. 14A shows another embodiment of the fastening system. In this embodiment, the linking member 1101 comprises a single key section 1121 and a single quick-release section 1161. The retaining member 1201 comprises a single retaining portion. The attachment mechanisms 1195, 1295 of this embodiment are configured to receive a belt or strap. The photograph on the right shows the embodiment with the associated belt or strap.

Figure 14B:
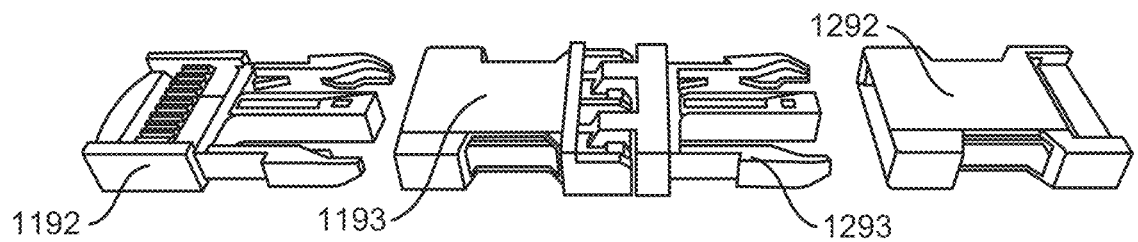
FIG. 14B is a schematic side perspective view of a fastening system that is equipped with an attachment mechanism configured to receive a squeeze-release buckling system.

FIG. 14B is a schematic side perspective view of a fastening system that is equipped with attachment mechanisms 1193, 1293 configured to receive a squeeze-release buckling system. In this embodiment, the attachment section of the linking member 1193 is configured to receive the male end 1192 of a squeeze release buckle, and the attachment section of the retaining member 1293 is configured to receive the female end 1292 of a squeeze-release buckle. In this way, the attachment section 1193, 1293 serves as an adapter, such that articles with pre-existing fasteners can benefit from the advantages of the presently disclosed fastening system embodiments. In alternative embodiments, the attachment section of the linking member can be configured to receive the female end of a squeeze release buckle, and the attachment section of the retaining member can be configured to receive the male end of a squeeze-release buckle. Embodiments can be configured to interact with or receive a multitude of existing fasteners.

Figure 15:
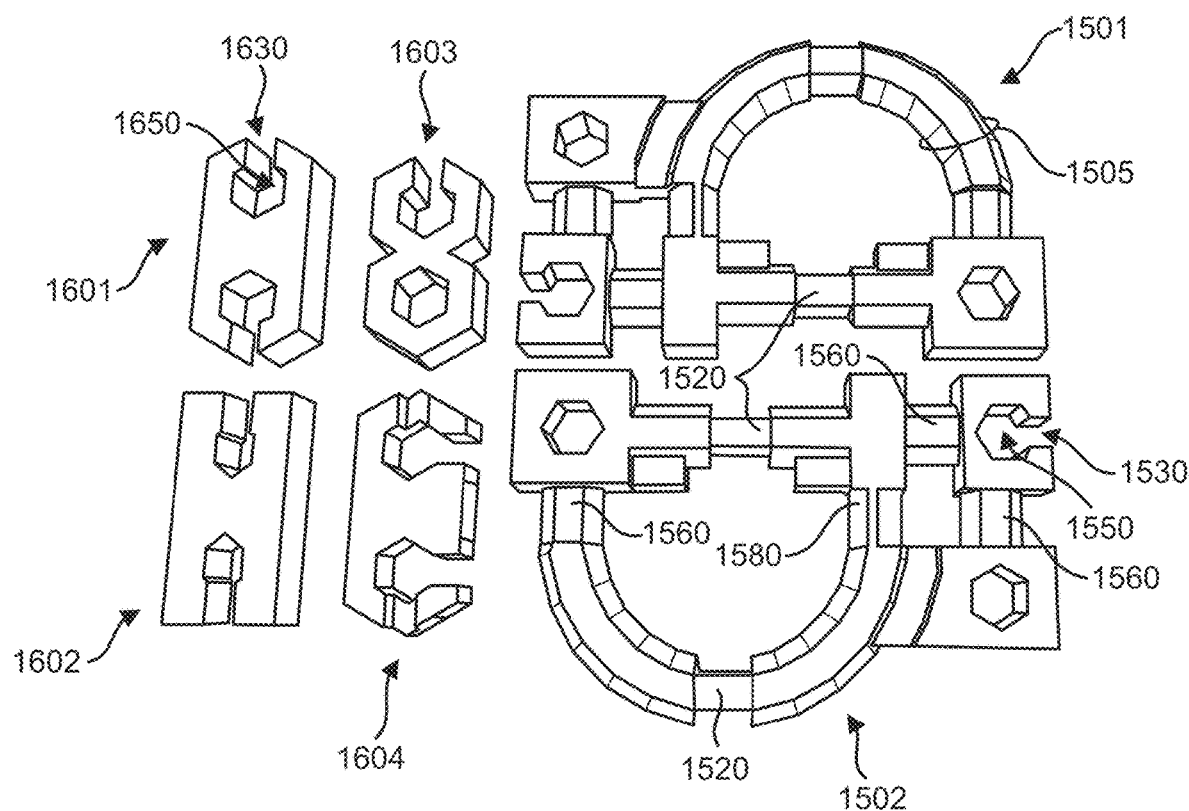
FIG. 15 shows a deconstructed view of a fastening system under yet another embodiment. Retaining members of various types and two B-shaped linking members shown.

FIG. 15 shows a top view of a deconstructed fastening system under yet another embodiment. Two identical B-shaped linking members 1501, 1502 are shown along with a variety of retaining members 1601, 1602, 1603, 1604. The linking members 1501, 1502 comprise several key sections 1520 and multiple quick-release sections 1560. The linking members 1501, 1502 also comprise a retaining portion 1550 and a keyhole 1530. Each of the retaining members 1601, 1602, 1603, 1604 comprises two keyholes 1630 and two retaining portions 1650

Figure 16:
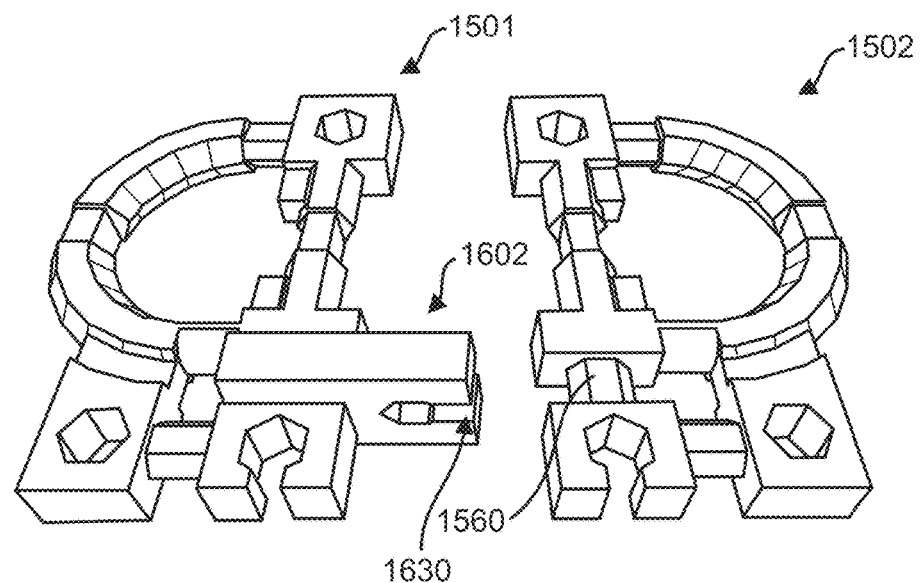
FIG. 16 shows the linking members of FIG. 15 being coupled together by a retaining member at a pair of quick-release sections.

FIG. 16 shows the linking members 1501, 1502 of FIG. 15 being coupled together by a retaining member 1602. The retaining member 1602 is shown with one retaining portion coupled to the quick-release section of the first linking member 1501. A key section 1630 of the retaining member 1602 is aligned with the quick-release section 1560 of the second retaining member 1502 for attachment thereto.

FIGS. 17A-17E provide serial views of a locking retaining member or locking clip 1604 securing two linking member 1501, 1502 to one another. The retaining member 1602 from FIG. 16 is shown attached to one quick-release section of the each retaining member 1501, 1502.

Figure 17A:
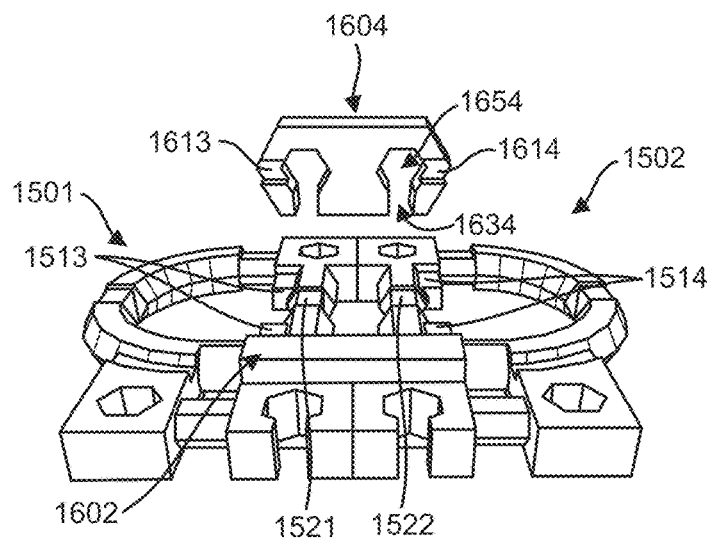
FIGS. 17A-17E provide multiple views of the coupled linking members of FIG. 16 being locked together via locking clips under one embodiment.

In FIG. 17A, the locking clip 1604 is shown exploded above a key section 1521, 1522 of each of the linking members 1501, 1502. The locking clip comprises two retaining portions 1654 and two keyholes 1634. A locking notch 1613, 1614 is shown at each end of the locking clip 1604. Likewise, each of the linking members 1501, 1502 comprises a pair of locking tabs 1513, 1514. One locking notch 1613 is configured to receive one of the locking tabs 1513 on the first linking member 1501, and the other locking notch 1614 is configured to receive one of the locking tabs 1514 on the second linking member 1502. The keyholes 1634 of the locking clip 1604 are disposed above and aligned with the neighboring key sections 1521, 1522 of the linking members 1501, 1502.

Figure 17B:
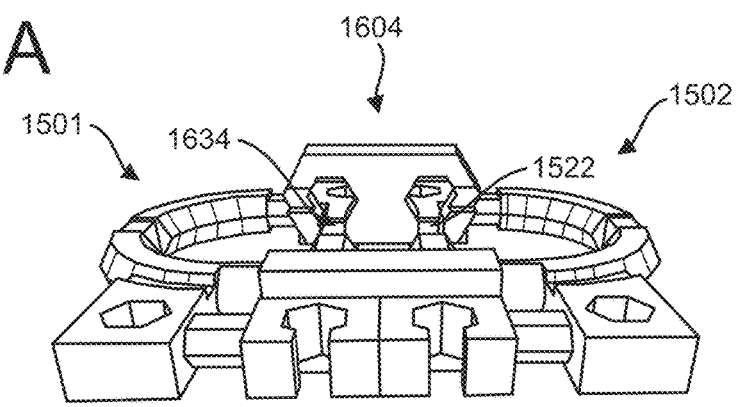

FIG. 17B shows the locking clip 1604 with its keyhole sections 1634 surrounding the key section 1521, 1522 of the two linking members 1501, 1502.

Figure 17C:
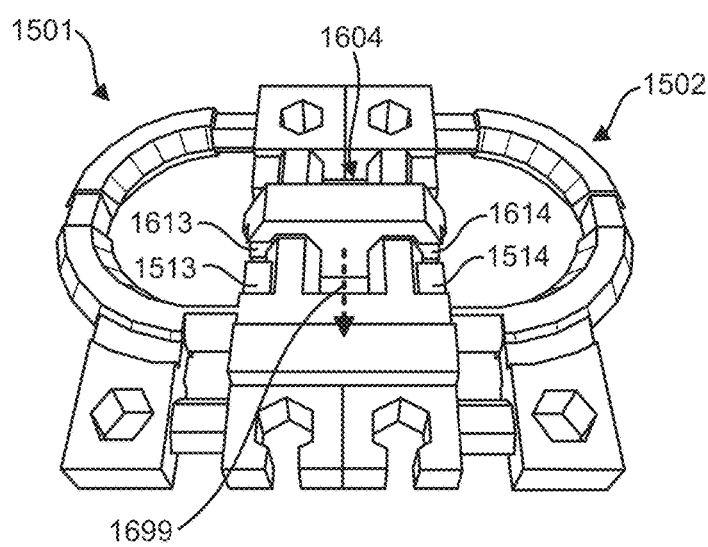
Figure 17D:
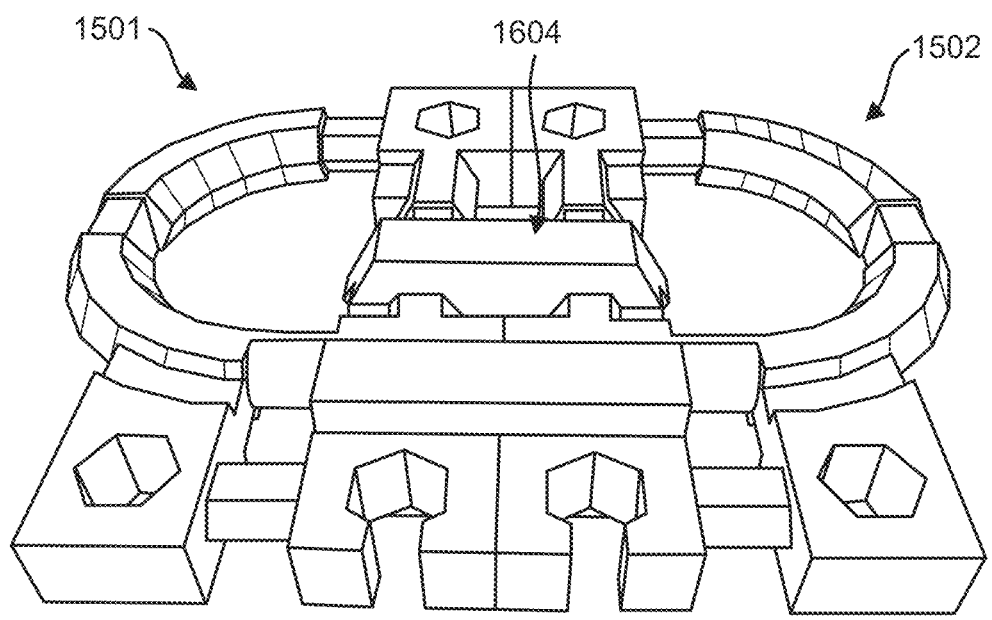

FIG. 17C provides a top perspective view of the linking members 1501, 1502 with the locking clip 1604 in place over the key section. The dotted arrow 1699 indicates the required direction that the locking clip must slide to permit the locking notches 1613, 1614 to engage the locking tabs 1513, 1514, which will help secure the two linking members 1501, 1502 to one another. In FIG. 17D the locking clip is in the locked position.

Figure 17E:
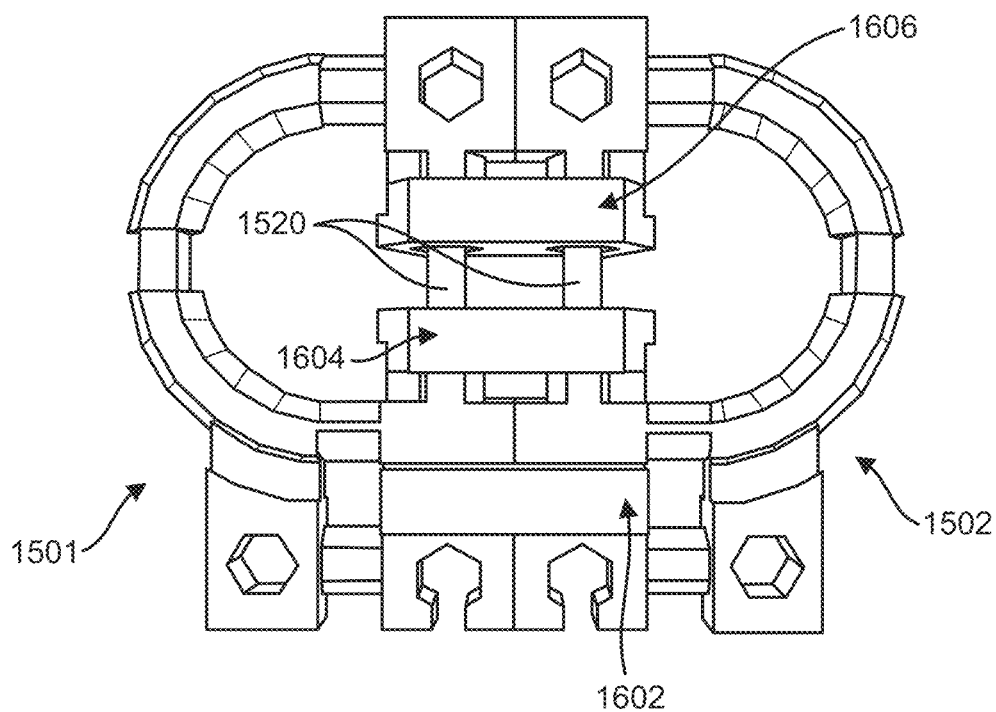

FIG. 17E, provides a top view of the two linking members 1501, 1502 secured to one another. A second locking clip 1606 is shown in a locked position opposite the first locking clip 1604. The two locking clips 1604, 1606 and the retaining member 1602 reversibly lock the two linking members 1501, 1502 together. To unlock the two linking members 1501, 1502 from the locked configuration of FIG. 17E, each of the locking clips 1604, 1606 must be slid back to the key sections 1520 of the linking members 1501, 1502 and then lifted off for removal. Next, the linking members 1501, 1502 must be pulled in directions opposite one another to free the retaining member 1602 from the quick-release sections of the linking members.

Figure 18:
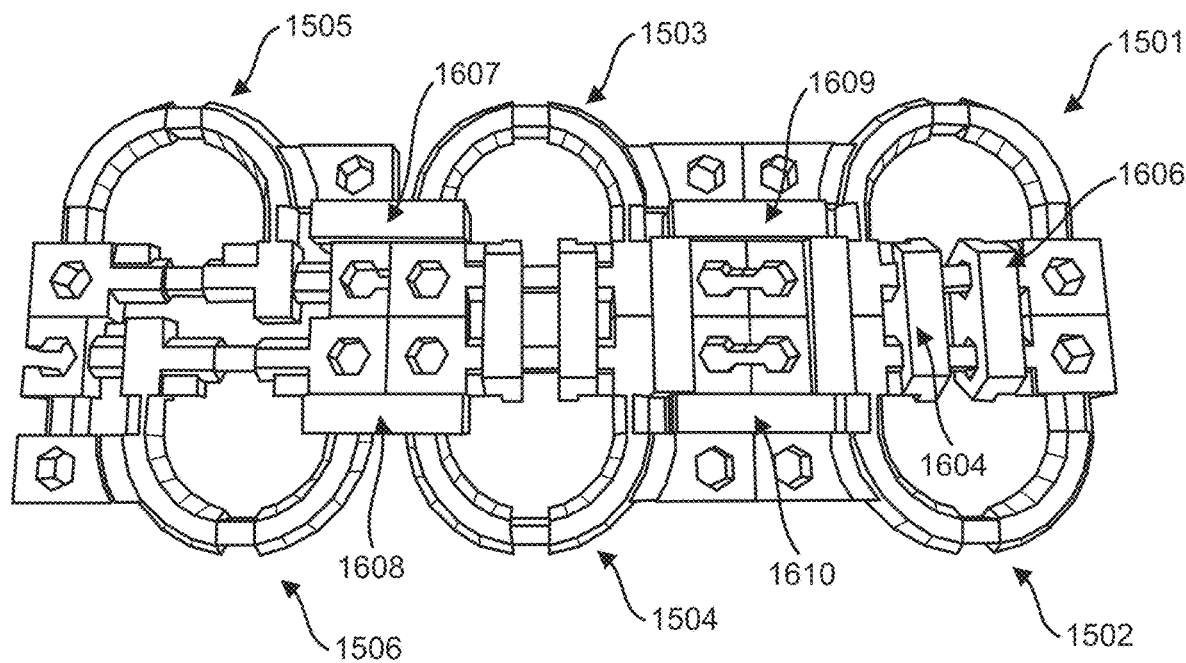
FIG. 18 shows six of the FIG. 15 linking members coupled together in multiple configurations.

FIG. 18 shows six of the FIG. 15 linking members 1501, 1502, 1503, 1504, 1505, 1506 coupled together in multiple configurations. The first wo linking member 1501, 1502 are shown coupled to one another in the configuration of FIG. 17E. The third and fourth linking members are coupled together in a mirror image of the first two linking members 1501, 1502. Each pair of linking members 1501/1502 and 1503/1504 is coupled to the other via a set of retaining members 1610, 1611 The fifth and sixth linking members 1505, 1506 are not physically coupled to one another. As shown, the fifth linking member 1505 is coupled to the third linking member 1503 via a retaining member 1607, and the sixth linking member 1506 is coupled to the fourth linking member 1504 via another retaining member 1608.

Figure 19:
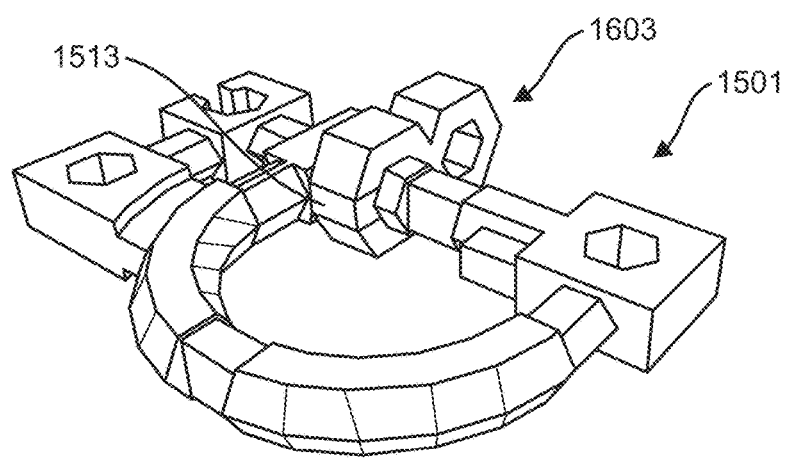
FIG. 19 offers a top perspective view of a FIG. 15 linking member with a retaining member in a locked position.

FIG. 19 offers a perspective view of a FIG. 15 linking member 1501 with a retaining member 1603 in a locked angular position. The retaining member 1603 is shown with its keyhole surrounding the locking tab 1515. When so oriented, the retaining member 1603 is not able to rotate around the body of the linking member 1501.

Figure 20A:
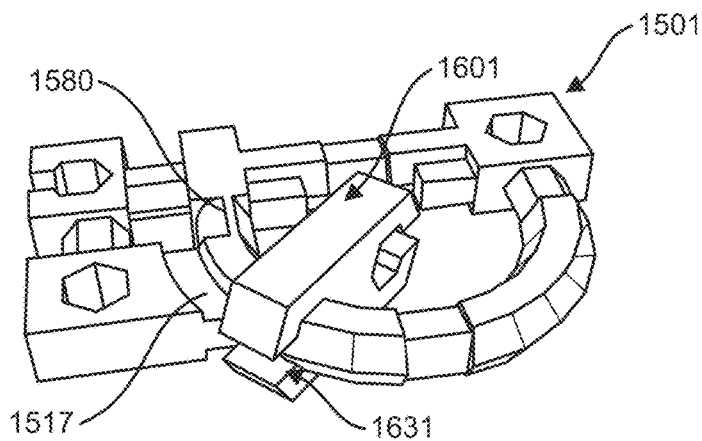
FIGS. 20A-20C provide sequential views of a retaining member being guided to a rotating section of a linking member under the FIG. 15 embodiment.
Figure 20B:
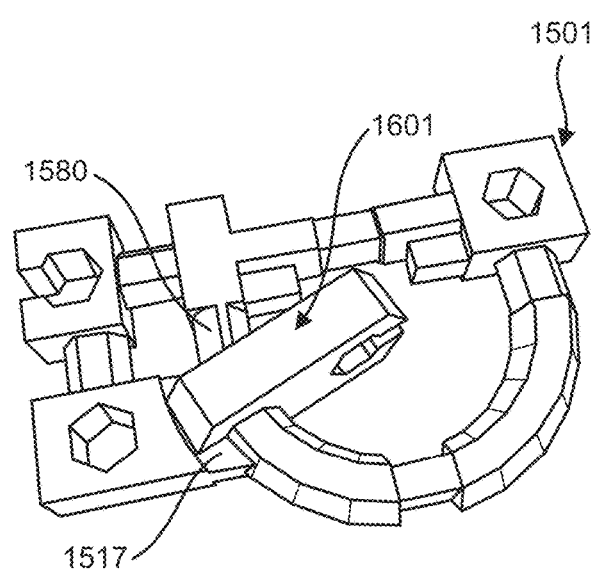
Figure 20C:
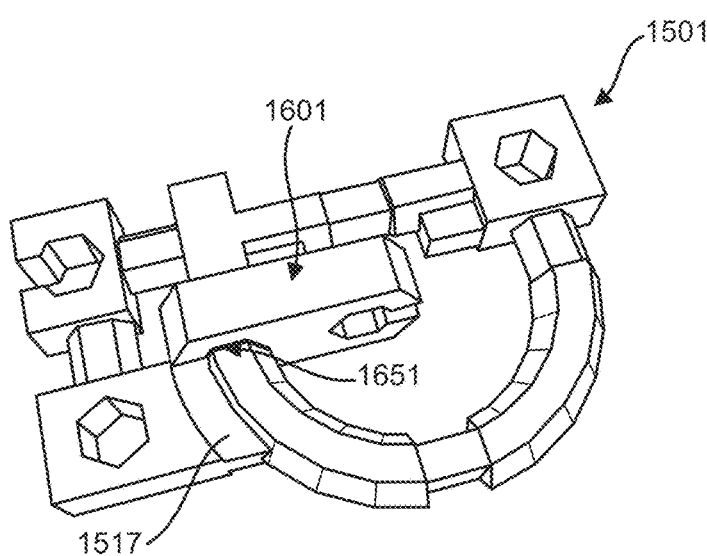

FIGS. 20A-20C provide sequential views of a retaining member 1601 being guided to a rotating section 1580 of a linking member 1501 under the FIG. 15 embodiment. FIG. 20A shows the retaining member 1601 with the retaining portion 1651 surrounding the body of the linking member 1501. A guide channel 1517 that terminates at the rotating section 1580 is also visible. The keyhole 1631 of the retaining member 1601 is aligned to allow the guide channel 1517 to pass therethrough.

FIG. 20B shows the retaining member 1601 sliding along the body of the linking member 1501 toward the rotating section 1580. In this view, the keyhole 1631 of the retaining member 1601 is disposed over the guide channel 1517.

FIG. 20C shows the retaining member 1601 with the retaining portion 1651 disposed over the rotating section 1680. When so oriented, the retaining member 1601 can rotate freely around the axis of the rotating section 1680.

Figure 21D:
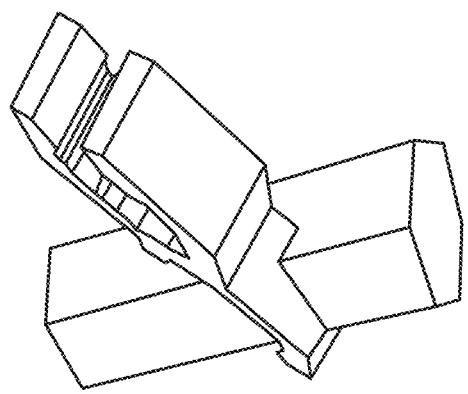
FIGS. 21A-21D shows fastening system under one embodiment with an alternative mechanism for locking a retaining member within a particular orientation on a linking member.
Figure 21C:
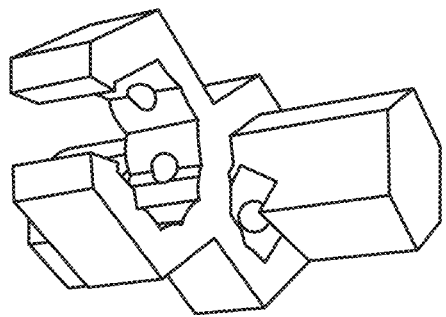
Figure 21B:
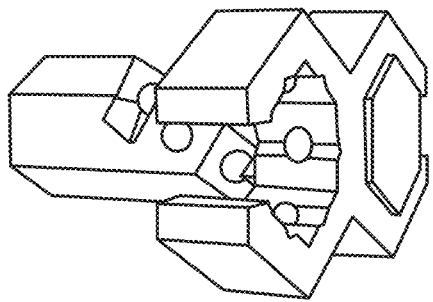
Figure 21A:
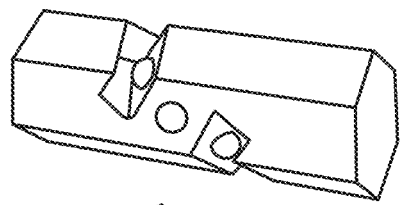
Figure 21A:
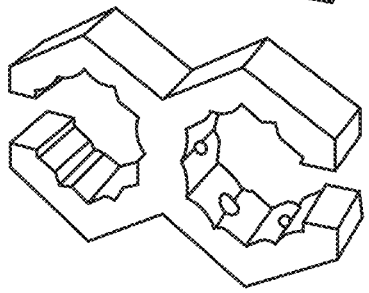

FIGS. 21A-21D shows a fastening system under an embodiment with alternative mechanism for locking a retaining member within a particular orientation on a linking member. FIG. 21A is a top perspective view of a retaining member lying flat (left) next to a linking member (right). FIG. 21B provides a top view of the retaining member in an upright position with a retaining portion surrounding the linking member. The linking member comprises two notches that extend into the body of the linking member and are configured to receive the retaining member. FIG. 21C shows the retaining member in an unlocked position on the linking member. When, as shown in FIG. 21D, the retaining member is disposed within the two notches of the linking member, the retaining members becomes embedded into the body of the linking member and assumes an alternative locked angular position relative to the linking member.

Rotating sections may be cylindrical or polyhedral. In embodiments with cylindrical rotating sections (FIGS. 2, 6, and 15 at 180, 480, 580, & 1580), a retaining member can be allowed to freely rotate around the axis of the linking member's body. In embodiments with polyhedral rotating sections, the retaining member may rotate around the faceted rotating sections from one fixed angular positions to another. By way of non-limiting example, in the embodiments of FIGS. 7-10, the rotating sections 780 are polyhedral with a generally hexagonal cross-sectional shape, and the retaining portions 850 are generally triangular in shape. Thus, in the exemplary embodiments of FIGS. 7-10, the retaining members 801-805 can be oriented in six different positions along the body of the rotating sections 780 with about 60° of rotation between each position. In such embodiments, a given amount of pressure on the retaining member in the direction of rotation is required to rotate the retaining members 801-805 within the rotating section 780 from one position to the next.

Any of the various embodiments described herein or otherwise obvious from this disclosure are appropriate for any number of uses where fastening and unfastening is required. In addition to any uses otherwise disclosed, embodiments of the present fastening system are appropriate for games, toys, and architectural kits such as construction blocks that can be repeatedly attached and detached from one another. Embodiments can also be useful for teaching scientific or engineering concepts including, but not limited to, chemistry, anatomy, programming, robotics, and architecture.

Embodiments can be created through the process of sculpting, injection molding, casting, or other known methods. Certain embodiments may be printed using three-dimensional printing technology.

The invention claimed is:

1. A fastening system comprising:
   a first linking member comprising a polygonal, circular, or elliptical shape that is defined by an internal circumference and an external circumference, the internal circumference defining an internal space centralized through the first linking member, wherein the first linking member further comprises a first faceted cross-sectional shape;
   the first linking member further comprising a key section, wherein the key section further comprises a second faceted cross-sectional shape, further wherein the second faceted cross-sectional shape comprises a form that is distinct from the first faceted cross-sectional shape;
   a retaining member comprising a retaining portion, wherein the retaining portion further comprises a faceted interior circumference that is complementary to the first faceted shape such that the retaining portion is configured to be slidably coupled to the first linking member;
   the retaining member further comprising a keyhole section configured to selectively allow the key section of the first linking member to pass therethrough.

2. The fastening system of claim 1, wherein the first linking member further comprises a quick-release section configured to allow for rapid uncoupling of the first linking member and retaining member under shear force when the retaining member is coupled to the quick-release section.

3. The fastening system of claim 1, wherein the first faceted cross-sectional shape and retaining portion are configured such that the first linking member remains in a locked angular position relative to the retaining member when slidably coupled thereto.

4. The fastening system of claim 3, further comprising a docking section, configured to prevent the retaining member from sliding along the circumference of the first linking member and further configured to securely maintain the first linking member in the locked angular position relative to the retaining member.

5. The fastening system of claim 4, wherein the docking section comprises a raised texture and recessed texture, wherein the raised textured comprises a form that is complementary to the recessed texture;
   further wherein the raised texture is disposed upon the first faceted cross-sectional shape of the first linking member, the recessed texture is disposed upon the faceted interior circumference of the retaining portion, or vice versa.

6. The fastening system of claim 3, wherein the first linking member further comprises a rotating section;
   the rotating section being configured to allow the first linking member to rotate within the faceted interior circumference of the retaining portion when the retaining member is coupled to the rotating section.

7. The fastening system of claim 1, wherein the first linking member further comprises a retaining portion.

8. The fastening system of claim 7, further comprising:
   a second linking member, comprising a polygonal, circular, or elliptical shape that is defined by an internal and an external circumference, wherein the second linking member further comprises a third faceted cross-sectional shape;
   the second linking member further comprising a key section, wherein the key section of the second linking member further comprises a defined cross-sectional shape that is distinct from the third faceted cross-sectional shape;
   further wherein, the retaining portion of the first linking member comprises a faceted interior circumference that is complementary to the third faceted cross-sectional shape such that the retaining portion is configured to be slidably coupled to the second linking member;
   the retaining portion of the first linking member further comprising a keyhole section configured to selectively allow the key section of the second linking member to pass therethrough.

9. The fastening system of claim 8, wherein the first faceted cross-sectional shape and the third faceted cross-sectional shape comprise the same form.

10. The fastening system of claim 1, wherein the shape of the first linking member comprises a square, rectangle, rhombus, parallelogram, trapezoid, pentagon, hexagon, heptagon, octagon, nonagon, decagon, or circle.

11. The fastening system of claim 1 further comprising an attachment section configured to secure the linking member, retaining member, or both to an article.

12. The fastening system of claim 11, wherein the article comprises an existing fastener and the attachment section is configured to be coupled with the article's existing fastener.

* * * * *